(12) United States Patent
Croteau et al.

(10) Patent No.: US 12,492,453 B2
(45) Date of Patent: Dec. 9, 2025

(54) HIGH-PERFORMANCE Al—Zn—Mg—Zr BASE ALUMINUM ALLOYS FOR WELDING AND ADDITIVE MANUFACTURING

(71) Applicant: NanoAL LLC, Ashland, MA (US)

(72) Inventors: Joseph R. Croteau, Boston, MA (US); Nhon Q. Vo, Winchester, MA (US); Joshua P. Dorn, Waltham, MA (US)

(73) Assignee: NanoAL LLC, Ashland, MA (US)

( * ) Notice: Subject to any disclaimer, the term of this patent is extended or adjusted under 35 U.S.C. 154(b) by 710 days.

(21) Appl. No.: 17/124,711

(22) Filed: Dec. 17, 2020

(65) Prior Publication Data
US 2021/0254196 A1   Aug. 19, 2021

Related U.S. Application Data

(63) Continuation of application No. PCT/US2019/038127, filed on Jun. 20, 2019.
(Continued)

(51) Int. Cl.
*C22C 21/10* (2006.01)
*B22F 1/065* (2022.01)
(Continued)

(52) U.S. Cl.
CPC ............. *C22C 21/10* (2013.01); *B22F 1/065* (2022.01); *B22F 10/25* (2021.01); *B22F 10/28* (2021.01); *B22F 10/64* (2021.01); *B23K 35/0227* (2013.01); *B23K 35/288* (2013.01); *B33Y 10/00* (2014.12); *B33Y 40/10* (2020.01);
(Continued)

(58) Field of Classification Search
CPC ....... C22C 21/10; C22C 1/026; C22C 1/0416; C22C 1/047; B23K 35/0227; B23K 35/288; B33Y 10/00; B33Y 70/00; B33Y 80/00; B33Y 40/20; B33Y 40/10; C22F 1/053; B22F 2301/052; B22F 2003/248; B22F 2007/068; B22F 2999/00; B22F 1/065; B22F 10/25; B22F 10/28; B22F 10/64; C23C 4/06; C23C 4/08; C23C 4/129;
(Continued)

(56) References Cited

U.S. PATENT DOCUMENTS 3,551,143 A   12/1970   Marukawa et al.
3,807,969 A    4/1974   Schoerner et al.
(Continued)

FOREIGN PATENT DOCUMENTS

CN   102676962 A   9/2012
CN   103233147 A   8/2013
(Continued)

OTHER PUBLICATIONS

CN-103469017-A Translation (Year: 2013).*
(Continued)

*Primary Examiner* — Danielle M. Carda
(74) *Attorney, Agent, or Firm* — COOLEY LLP

(57) ABSTRACT

Aluminum-zinc-magnesium base alloys that comprise a transition metal and/or a rare earth metal are provided. The disclosed aluminum alloys are suitable for use in additive manufacturing and welding processes due to their mechanical properties and thermal stability. Methods for producing the disclosed alloys, as well as methods of manufacturing aluminum alloy components, are also provided.

31 Claims, 8 Drawing Sheets

Related U.S. Application Data

(60) Provisional application No. 62/687,418, filed on Jun. 20, 2018.

(51) Int. Cl.
| | |
|---|---|
| *B22F 10/25* | (2021.01) |
| *B22F 10/28* | (2021.01) |
| *B22F 10/64* | (2021.01) |
| *B23K 35/02* | (2006.01) |
| *B23K 35/28* | (2006.01) |
| *B33Y 10/00* | (2015.01) |
| *B33Y 40/10* | (2020.01) |
| *B33Y 70/00* | (2020.01) |
| *B33Y 80/00* | (2015.01) |
| *C22C 1/02* | (2006.01) |
| *C22F 1/053* | (2006.01) |

(52) U.S. Cl.
CPC .............. *B33Y 70/00* (2014.12); *C22C 1/026* (2013.01); *C22F 1/053* (2013.01); *B22F 2301/052* (2013.01); *B33Y 80/00* (2014.12)

(58) Field of Classification Search
CPC .......... C23C 4/134; C23C 4/18; C23C 24/08; C23C 24/087; Y02P 10/25
USPC ....................................................... 148/552
See application file for complete search history.

(56) References Cited

U.S. PATENT DOCUMENTS

| | | | |
|---|---|---|---|
| 3,993,476 A | 11/1976 | Koike | |
| 4,028,795 A | 6/1977 | Takahashi et al. | |
| 4,995,920 A * | 2/1991 | Faure | C22F 1/053 |
| | | | 148/552 |
| 5,087,301 A | 2/1992 | Angers et al. | |
| 5,110,372 A | 5/1992 | Faure | |
| 5,327,955 A | 7/1994 | Easwaran | |
| 5,449,421 A | 9/1995 | Hamajima et al. | |
| 5,624,632 A | 4/1997 | Baumann et al. | |
| 5,976,214 A | 11/1999 | Kondoh et al. | |
| 6,149,737 A | 11/2000 | Hattori et al. | |
| 6,312,643 B1 * | 11/2001 | Upadhya | B22F 3/006 |
| | | | 419/33 |
| 6,592,687 B1 | 7/2003 | Lee et al. | |
| 6,918,970 B2 | 7/2005 | Lee et al. | |
| 7,648,593 B2 | 1/2010 | Pandey | |
| 7,837,808 B2 | 11/2010 | Heymes et al. | |
| 7,871,477 B2 | 1/2011 | Pandey | |
| 7,879,162 B2 | 2/2011 | Pandey | |
| 7,909,947 B2 | 3/2011 | Pandey | |
| 8,017,072 B2 | 9/2011 | Pandey | |
| 8,323,373 B2 | 12/2012 | Haynes, III et al. | |
| 8,409,373 B2 | 4/2013 | Pandey | |
| 8,778,099 B2 | 7/2014 | Pandey | |
| 9,453,272 B2 | 9/2016 | Vo et al. | |
| 11,603,583 B2 | 3/2023 | Vo et al. | |
| 2003/0192627 A1 | 10/2003 | Lee et al. | |
| 2004/0177902 A1 | 9/2004 | Mergen et al. | |
| 2006/0093736 A1 | 5/2006 | Raybould et al. | |
| 2009/0263273 A1 * | 10/2009 | Pandey | C22F 1/053 |
| | | | 420/541 |
| 2009/0263275 A1 | 10/2009 | Pandey | |
| 2010/0143177 A1 | 6/2010 | Pandey et al. | |
| 2010/0252148 A1 | 10/2010 | Pandey | |
| 2011/0017359 A1 | 1/2011 | Pandey | |
| 2011/0017366 A1 | 1/2011 | Yoshida et al. | |
| 2011/0044843 A1 | 2/2011 | Misra et al. | |
| 2011/0044844 A1 * | 2/2011 | Pandey | C22C 21/10 |
| | | | 420/528 |
| 2011/0052932 A1 | 3/2011 | Pandey | |
| 2012/0000578 A1 | 1/2012 | Wang et al. | |
| 2012/0023444 A1 | 1/2012 | Patil et al. | |
| 2012/0234440 A1 | 9/2012 | Miyata et al. | |
| 2013/0183189 A1 | 7/2013 | Bishop et al. | |
| 2013/0199680 A1 | 8/2013 | Apelian et al. | |
| 2013/0220497 A1 | 8/2013 | Huskamp et al. | |
| 2014/0010700 A1 | 1/2014 | Pandey | |
| 2014/0209223 A1 | 7/2014 | Hashimoto et al. | |
| 2015/0135897 A1 | 5/2015 | Sutcliffe et al. | |
| 2016/0368244 A1 | 12/2016 | Chung | |
| 2017/0016102 A1 | 1/2017 | Nakanishi et al. | |
| 2017/0058386 A1 | 3/2017 | Vo et al. | |
| 2017/0182595 A1 | 6/2017 | Nelson et al. | |
| 2017/0233857 A1 * | 8/2017 | Lenczowski | B33Y 80/00 |
| | | | 148/535 |
| 2018/0010215 A1 | 1/2018 | Sanaty-Zedah et al. | |
| 2018/0010216 A1 | 1/2018 | Vo et al. | |
| 2019/0032175 A1 | 1/2019 | Martin et al. | |

FOREIGN PATENT DOCUMENTS

| | | | | |
|---|---|---|---|---|
| CN | 103397228 A | | 11/2013 | |
| CN | 103469017 A | * | 12/2013 | |
| CN | 103509978 A | * | 1/2014 | |
| CN | 104789833 A | | 7/2015 | |
| CN | 105401020 A | | 3/2016 | |
| CN | 105401026 A | | 6/2016 | |
| DE | 102013004182 A1 | | 5/1987 | |
| EP | 0375571 A1 | | 6/1990 | |
| EP | 0 558 957 A2 | | 9/1993 | |
| EP | 1 170 394 A2 | | 1/2002 | |
| EP | 2 241 644 A1 | | 10/2010 | |
| EP | 1660272 B1 | | 12/2017 | |
| JP | H60-033333 A | | 2/1985 | |
| JP | S60-248862 A | | 12/1985 | |
| JP | S6318034 A | | 1/1988 | |
| JP | H01-143791 A | | 6/1989 | |
| JP | H02258935 A | | 10/1990 | |
| JP | H0413839 A | | 1/1992 | |
| JP | H05208295 A | * | 8/1993 | |
| JP | H05-320809 A | | 12/1993 | |
| JP | H0651895 B2 | | 7/1994 | |
| JP | H073353 A | | 1/1995 | |
| JP | H07252573 A | | 10/1995 | |
| JP | H1015120 A | | 1/1998 | |
| JP | S10-060554 A | | 3/1998 | |
| JP | H10298692 A | | 11/1998 | |
| JP | H1180876 A | | 3/1999 | |
| JP | 2004-197170 A | | 7/2004 | |
| JP | 2008-202134 A | | 9/2008 | |
| JP | 2009035766 A | | 2/2009 | |
| JP | 2013-256678 A | | 12/2013 | |
| JP | 2017186651 A | | 10/2017 | |
| JP | 2018532044 A | | 11/2018 | |
| JP | 2019060008 A | | 4/2019 | |
| WO | WO 2013/183488 A1 | | 12/2013 | |
| WO | WO-2017041006 A1 | * | 3/2017 | B22F 10/60 |
| WO | WO-2017126413 A1 | | 7/2017 | |
| WO | WO-2018009359 A1 | | 1/2018 | |

OTHER PUBLICATIONS

CN-103509978-A Translation (Year: 2014).*
JPH 05208295A Translation (Year: 1993).*
Non-Final Office Action mailed May 4, 2016 for U.S. Appl. No. 14/645,654, 8 pages.
Non-Final Office Action mailed Dec. 31, 2018 for U.S. Appl. No. 15/263,011, 5 pages.
Final Office Action mailed Aug. 8, 2019 for U.S. Appl. No. 15/263,011, 7 pages.
Final Office Action mailed Feb. 24, 2021 for U.S. Appl. No. 15/263,011, 7 pages.
Non-Final Office Action mailed Feb. 5, 2018 for U.S. Appl. No. 15/681,969, 7 pages.
Non-Final Office Action mailed Jun. 12, 2018 for U.S. Appl. No. 15/681,969, 8 pages.
Final Office Action mailed Oct. 29, 2018 for U.S. Appl. No. 15/681,969, 9 pages.

(56) References Cited

OTHER PUBLICATIONS

Non-Final Office Action mailed May 5, 2020 for U.S. Appl. No. 15/681,969, 8 pages.
Final Office Action mailed Jan. 22, 2021 for U.S. Appl. No. 15/681,969, 11 pages.
Extended European Search Report dated Feb. 15, 2017 for European Application No. 15760733.4, 9 pages.
Extended European Search Report dated Sep. 23, 2019 for European Application No. 19172652.0, 8 pages.
International Search Report and Written Opinion mailed Jun. 25, 2016 for International Application No. PCT/US2015/020218, 14 pages.
International Search Report and Written Opinion mailed Sep. 6, 2017 for International Application No. PCT/US2017/039211, 10 pages.
Office Action dated Sep. 2, 2020 from Chinese Application No. 201780051464.7, with English translation, 26 pages.
Second Office Action dated Apr. 2, 2021 for Chinese Application No. 201780051464.7, with English translation, 17 pages.
Extended European Search Report dated Nov. 22, 2019 for European Application No. 17824704.5, 11 pages.
Communication Pursuant to Article 94(3) EPC dated Jun. 15, 2021 for European Application No. 17824704.5, 5 pages.
Notice of Reasons for Rejection dated Mar. 2, 2020 for Japanese Application No. 2019-500396, with English translation, 17 pages.
Notice of Reasons for Rejection dated Jan. 5, 2021 for Japanese Application No. 2019-500396, with English translation, 11 pages.
International Search Report and Written Opinion mailed Aug. 7, 2020 for International Application No. PCT/US2019/038127, 23 pages.
Al-Aqeeli, N. et al., "Development of new Al-based nanocomposites by mechanical alloying," Materials Science and Engineering A, 480:392-396 (2008).
Ahmad, Z. & Aleem, Abdul B. J., "Effect of nano Al($SC_{x-1}Zr_x$) precipitates on the mechanical and corrosion behavior of Al-2.5 Mg Alloys," Materials and Corrosion, 62(4):335-345 (2011),.
Berezina, A. L. et al., "Decomposition Processes in the Anomalous Supersaturated Solid Solution of Binary and Ternary Aluminum Alloys Alloyed with Sc and Zr," Acta Physica Polonica A, 122(3):539-543 (2011).
Booth-Morrison, C et al., "Effect of Er additions on ambient and high-temperature strength of precipitation-strengthened Al—Zr—Sc—Si alloys," Acta Mater, 60:3463-3654 (2012).
Booth-Morrison, C. et al., "Role of silicon in accelerating the nucleation of Al3(Sc,Zr) precipitates in dilute Al—Sc—Zr alloys," Acta Mater, 60:4740-4752 (2012).
Booth-Morrison, C et al., "Coarsening resistance at 400° C. of precipitation-strengthened AlZrScEr Alloys," Acta Mater, 59(18):7029-7042 (2011).
Davis, J. R., ASM Specialy Handbook, Aluminum and Aluminum Alloys, ASM International, (1993), 4 pages.
Fuller, C. B. et al., "Temporal evolution of the nanostructure of Al(Sc,Zr) alloys: Part 1—Chemical compositions of Al3($SC_{1-x}Zr_x$) precipitates," Acta Mater, 53:5401-5413 (2005).
Grimes, R. et al., "Development of a high strain rate superplastic Al—Mg—Zr alloy," Material Science and Technology, 16:1334-1339 (2000).
Hallem, H. et al., "The formation of $Al_3(Sc_xZryHf_{1-x-y})$ dispersoids in aluminum alloys," Mater Sci Eng A, 421:154-160 (2006).
Hori, S. et al., "Effect of small addition of Si on the precipitation of Al—0.6%Zr Alloys," J Jpn Inst Light Met, 28:79-84 (1978).
Huang, H. et al., "Age Hardening Behavior and Corresponding Microstructure of Dilute Al—Er—Zr Alloys," Metallurgical and Materials Transactions A, 44A:2849-2856 (2013).
Hull, M., "Superplastic PM alloys aim for automotive applications," Powder Metallurgy, 43(3):203-206 (2000).
Joys, J., "Production of aluminum and Aluminum-Alloy Powder," Powder Metallurgy, vol. 7, ASM Handbook, ASM International, 2015, pp. 569-580.

Kalinenko, A. et al., "Properties and Structure of Al—Zr—Fe—Si Alloy after Thermomechanical Treatment," AIP Conference Proceedings 2051, 020117 (2018), 11 pages; doi: 10.1063/1.5083360.
Knipling, K. E. et al., "Criteria for developing castable, creep-resistant aluminum-based alloys—A Review," Z Metallkd, 97:246-265 (2006).
Knipling, K. E. et al., "Atom Probe Tomographic Studies of Precipitation in Al—0.1Zr—0.1Ti (at.%) Alloys," Microscopy and Microanalysis, 13:1-14 (2007).
Knipling, K. E. et al., "Nucleation and Precipitation Strengthening in Dilute Al—Ti and Al—Zr Alloys," Metallurgical and Materials Transactions A, 38A:2552-2563 (2007).
Knipling, K. E. et al., "Creep resistance of cast and aged Al—0.1Zr and Al-0.1Zr—0.1Ti (at.%) alloys at 300-400° C.," Scrpta Materialia, 59:387-390 (2008).
Knipling, K. E. et al., "Precipitation evolution in Al—Zr and Al—Zr—Ti alloys during isothermal aging at 375-425° C.," Acta Mater, 56:114-127 (2008).
Knipling, K. E. et al., "Precipitation evolution in Al—Zr and Al—Zr—Ti alloys during isothermal aging at 450-600° C.," Acta Mater, 56:1182-1195 (2008).
Knipling, K. E. et al., "Precipitation evolution in Al—0.1Sc, Al—0.1Zr and Al—0.1Sc—0.1Zr (at.%) alloys during isochronal aging," Acta Mater, 58:5184-5195 (2010).
Knipling, K. E et al., "Ambient- and high-temperature mechanical properties of isochronally aged Al—0.06Sc, Al—0.06Zr and Al—0.06Sc—0.06Zr (at.%) alloys," Acta Mater, 59:943-954 (2011).
LeClaire, A. D et al., "3.2.13 Aluminum group metals," Diffusion in Solid Metals and Alloys (H. Mehrer (Ed.), Springer Materials—Landolt-Börnstein—Group III condensed Matter, 26:151-156 (1990).
Li, H. et al., "Precipitation and evolution and coarsening resistance at 400 of Al microalloyed with Zr and Er," Scr Mater, 67:73-76 (2012).
Ma, Z. Y. et al., "High strain rate superplasticity in friction stir processed Al—Mg—Zr alloy," Material Science and Engineering A, 351:148-153 (2003).
Ma, Z. Y., "Friction Stir Processing Technology: A Review," Metallurgical and Materials Transactions A, 39(3):642-658 (2008).
Martin, J. H. et al., "3D printing of high-strength aluminium alloys," Nature, 549:365-369 (2017).
Nicolas, M. & Deschamps, A., "Characterisation and modelling of precipitate evoluation in an Al—Zn—Mg alloy during non-isothermal heat treatments," Acta Materialia, 51:6077-6094 (2003).
Ohashi, T. et al., "Effect of Fe and Si on age hardening properties of supersaturated solid solution of Al—Zr," J Jpn. Inst Met, 34:604-640 (1970).
Olakanmi, E. O. et al., "A review on selective laser sintering/melting (SLS/SLM) of aluminium alloy powders: Processing, microstructure, and properties," Progress in Materials Science, 74:401-477 (2015).
Riddle, Y. W. et al., "A Study of Coarsening, Recrystallization, and Morphology of Microstructure in Al—Sc—(Zr)—(Mg) Alloys," Metallurgical and Materials Transactions A, 35A:341-350 (2004).
Sato, T. et al., "Effects of Si and Ti Additions on the Nucleation and Phase Stability of the L12-Type Al3Zr Phase in Al—Zr Alloys," Mater Sci Forum, 217-222:895-900 (1996).
Seidman, D. N. et al., "Precipitation strengthening at ambient and elevated temperatures of heat-treatable Al(Sc) alloys," Acta Mater, 50:4021-4035 (2002).
Van Dalen, M. E et al., "Effects of Ti additions on the nanostructure and creep properties of precipitation-strengthened Al—Sc alloys," Acta Mater, 53:4225-4235 (2005).
Wen, S. P. et al., "Synergetic effect of Er and Zr on the precipitation hardening of Al—Er—Zr alloy," Scr Mater, 65:592-595 (2011).
Zhang, Y. et al., "Precipitation evolution of Al—Zr—Yb alloys during isochronal aging," Scr Mater, 69:477-480 (2013).
First Office Action dated Oct. 8, 2021 for Chinese Application No. 201980053543.0, with English translation, 28 pages.
Japanese Office Action for Application No. JP20190500396dated Jan. 18, 2022, 5 pages.
Li Shichun, "Interphase Diffusion Solution Zone-Superplastic of Zn—Al Eutectic Alloy," 1st Edition, China University of Petroleum Press, pp. 90-91, Jul. 2006, with English translation, 7 pages.

(56) References Cited

OTHER PUBLICATIONS

Non-Final Office Action mailed Apr. 13, 2022 for U.S. Appl. No. 15/681,969, 7 pages.
Non-Final Office Action mailed Dec. 21, 2021 for U.S. Appl. No. 15/263,011, 7 pages.
Notice of Reasons for Rejection dated Sep. 20, 2021 for Japanese Application No. 2019-500396, with English translation, 5 pages.
Office Action dated Aug. 13, 2021 for Korean Application No. 10-2016-7028392, with English translation, 14 pages.
Office Action for Indian Application No. IN202117002095 dated Jan. 13, 2023, 8 pages.
Office Action for Indonesian Application No. P00202100438 dated Dec. 15, 2022, with translation, 6 pages.
Office Action for Japanese Application No. JP2020570797 dated Feb. 27, 2024, 11 pages.
Office Action for Japanese Application No. JP2020570797 dated May 29, 2023, with English translation, 22 pages.
Ohashi T., et al., "Duplex-precipitation Hardening in Al—Zn—Mg Alloys Highly Super-saturated with Zr, "Metallurgical Transactions, 1998, pp. 546-549.
Osintsev O.E., et al., "Strengthening Mechanism of Rapidly Solidified Al—Zn—Mg—(Cu) Alloys," Metally, 2007, vol. (5), pp. 110-116, with English translation of Abstract only, 8 pages.
Rejection Decision dated Oct. 29, 2021 for Chinese Application No. 201780051464.7, with English translation, 14 pages.
Second Office Action and Search Report dated Jul. 18, 2022 for Chinese Application No. CN201980053543, with English translation, 12 pages.
Third Office Action and Search Report for Chinese Application No. CN20198053543 dated Mar. 22, 2023, with English translation, 31 pages.
Board Opinion for Chinese Patent Application No. CN 201780051464.7, with English translation, dated Apr. 28, 2024, 22 pages.
Abramov, V., et al.; "Solidification of aluminium alloys under ultrasonic irradiation using water-cooled resonator," Materials Letters; 37(1):27-34 (1998).
Neikov, O.D., et al.; "Water atomised aluminium alloy powders," Materials Science and Engineering: A; 383(1):7-13 (2004).
Office Action for European Application No. 19867840.1, mailed Jan. 24, 2025, 14 pages.

\* cited by examiner

HIGH-PERFORMANCE Al—Zn—Mg—Zr BASE ALUMINUM ALLOYS FOR WELDING AND ADDITIVE MANUFACTURING

CROSS-REFERENCE TO RELATED APPLICATION

The application is a continuation of International Patent Application No. PCT/US2019/038127 entitled "High-performance Al—Zn—Mg—Zr Base Aluminum Alloys for Welding and Additive Manufacturing," filed Jun. 20, 2019, which claims priority to and the benefit of U.S. Provisional Patent Application Ser. No. 62/687,418 entitled, "High-performance Al—Zn—Mg—Zr Base Aluminum Alloys for Welding and Additive Manufacturing," filed Jun. 20, 2018, the disclosures of which are incorporated herein by reference in their entireties.

FIELD

This application relates to a family of Al—Zn—Mg and Al—Zn—Mg—Cu alloys, or 7000-series aluminum alloys, which, when processed by (i) a conventional manufacturing technique (e.g. sheet casting), (ii) a powder metallurgy process, or (iii) an additive manufacturing technique utilizing a melting process, can fabricate a component with ultra-high strength, improved thermal stability and weldability, compared to other commercial 7000-series aluminum alloys.

BACKGROUND 7000-series aluminum alloys are among the highest strength alloys available. Owing to this and other properties, they are often employed in the automotive, aircraft, and aerospace industries. However, 7000-series aluminum alloys are generally recognized by those skilled in the art as being nearly impossible to weld, which limits their use in numerous applications. Accordingly, the ability to provide weldable 7000-series aluminum alloys is highly desirable. Such materials would also be suitable for use in manufacturing processes such as additive manufacturing (i.e., 3D printing), to produce aluminum alloy components and products.

SUMMARY

The embodiments described herein relate to a 7000-series aluminum-zinc-magnesium-based alloy, comprising one or more additional transition metals or rare earth metals, and optionally copper. The aluminum alloy, which may further include an inoculant (Sn, In, or Sb), can be fabricated into a feedstock (i.e., sheet, wire, powder, etc.) suitable for use in a manufacturing method, which may utilize welding, an additive manufacturing method which utilizes a wire or powder as feedstock, or a powder metallurgy method. In various aspects, the present disclosure provides an aluminum alloy comprising about 4 to about 12% by weight zinc, about 1 to about 4% by weight magnesium, about 0.3 to about 2% by weight zirconium, and aluminum as the remainder. The alloy is found to possess a strength to weight ratio at room temperature, which is at least as great as that of a conventional 7000-series aluminum alloy. As a result of the beneficial properties, the aluminum alloys of the present disclosure can be used in a welding process substantially without resulting liquation-cracking and/or hot-tearing that would result from using the conventional 7000-series aluminum alloy in the welding process. Furthermore, the aluminum alloys of the present disclosure do not comprise any intentionally added scandium.

The present disclosure also provides a method of producing a weldable aluminum alloy. This method comprises melting recycled or virgin aluminum, while adding aluminum-master alloys or pure elements, at a temperature of about 700° C. to about 1000° C. to form a liquid mixture of constituents, the liquid mixture of constituents comprising about 4 to about 12% by weight zinc, about 1 to about 4% by weight magnesium, about 0.3 to about 2% by weight zirconium or alternatively about 0.3 to about 2% by weight titanium, hafnium, vanadium, niobium, tantalum, chromium, molybdenum, tungsten, yttrium, lanthanum, cerium, praseodymium, neodymium, gadolinium, dysprosium, erbium, or ytterbium, or combinations thereof, optionally up to about 3% by weight copper, and aluminum as the remainder, wherein the liquid mixture of constituents does not comprise any intentionally added scandium. The melted constituents can be casted into an ambient or a chilled casting mold to form a casted ingot, and heat treated at a temperature of about 400° C. to about 480° C. for a time of about 0.25 hours to about 6 hours to form a solutionized ingot comprising an Al—Zn—Mg solid-solution with a dispersion of $L1_2$ structured $Al_3Zr$ nano-scale precipitates. The solutionized ingot can be hot-formed and/or cold-formed into a sheet, a foil, a rod, a wire, an extrusion, or a forging.

Further methods are directed to the manufacture of a net-shape component, a near-net-shape component, or a component extruded from a billet. These methods comprise subjecting the 7000-series aluminum alloys of the present disclosure to an additive manufacturing process or a powder metallurgy process to manufacture the net-shape component, the near-net-shape component, and in the case of powder metallurgy, a component extruded from a billet. The components can be heat aged at a temperature of about 100° C. to about 180° C. for a time of about 1 hour to about 48 hours, to achieve a simultaneous dispersion of fine-scale $Zn_2Mg$ precipitates, primary precipitates (e.g., $Al_3Zr$), and $Al_3Zr$ nano-scale precipitates, resulting in the component having a strength which is at least as great as that of a net-shape component, near-net-shape component, or component extruded from a billet conventionally manufactured from a conventional 7000-series aluminum alloy.

The disclosed aluminum alloys can also be used to repair or form a protective coating on a component made from an aluminum alloy. This involves subjecting an aluminum alloy powder to a cold spray process, a thermal spray process, a laser-assisted cold spray process, or a laser cladding process to repair or to form a protective coating on, the component. The component made from an aluminum alloy can be heated treated at a temperature of about 400° C. to about 480° C. for a time of about 0.25 hours to about 6 hours. In some instances, after heat-treating the component, the component made from an aluminum alloy can be heat aged at a temperature of about 100° C. to about 180° C. for a time of about 1 hour to about 48 hours.

An advantage of the 7000-series aluminum alloys disclosed herein is their ability to be welded. Accordingly, a method of preparing a welded metallic assembly is provided. This method comprises joining two or more aluminum alloy components with a filler material in a welding process. The filler material joining the components can be a wire or rod fabricated from a 7000-series aluminum alloy. The two or more aluminum alloy components can each be independently selected from the group consisting of Al—

Zn—Mg alloys, Al—Zn—Mg—Cu alloys, Al—Zn—Mg—Zr alloys, and Al—Zn—Mg—Cu—Zr alloys. As described, these alloys comprise about 4 to about 12% by weight zinc, about 1 to about 4% by weight magnesium, about 0.3 to about 2% by weight zirconium, and up to about 3% copper when present. Aluminum makes up the remainder of the composition, which is free of intentionally added scandium.

BRIEF DESCRIPTION OF THE DRAWINGS

The drawings contained herein are examples of the microstructures of the metal alloys described herein, and of the material properties which may be achieved by certain embodiments described herein and are not limiting in any way.

DETAILED DESCRIPTION

Figure 1:
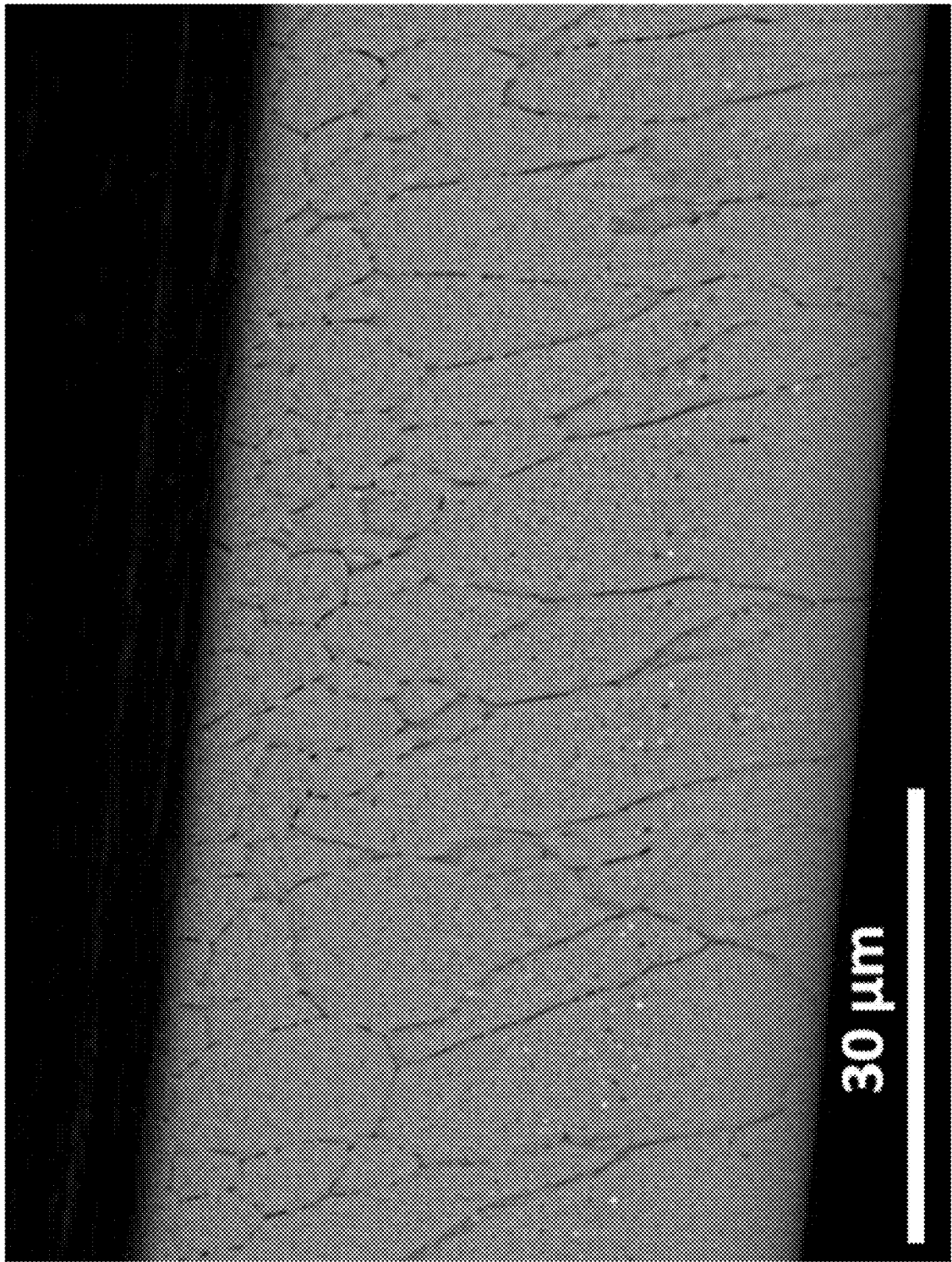
FIG. 1 is a scanning electron micrograph of a melt-spun ribbon of Al-11Zn-2.5Mg-1Cu wt. %. Grains are large, spanning the width of the ribbon.

Conventional 7000-series alloy metal powders consist primarily of zinc and magnesium, and optionally of copper, with aluminum being the remainder. This combination of alloying elements is what makes up the 7000 series of aluminum alloys. These alloys are strengthened by the formation of $Zn_2Mg$ precipitates, which form in the solid alloy during a post-process aging treatment. Adding copper to the Al—Zn—Mg based system is known to improve the strength of alloy, but it also degrades the corrosion resistance and the ability of the alloy to be welded. The ability to be welded is an essential prerequisite for an alloy to be processed by an additive manufacturing method.

In a conventional manufacturing process (e.g., sheet casting) which utilizes welding, two solid metal components are placed in contact with one another, and an energy source is used to locally melt the surface of the two components, and the liquid phase of the two components are mixed by convection. Once solidified, the two components are metallurgically joined, and the chemical composition across the weld is often indistinguishable from the base material. In such processes, the energy source may be an electric current, a laser beam, or an electron beam. In certain processes, additional metal is added to the weld by feeding a wire or a rod into the molten weld, the added material is melted by the energy source and is mixed by convection with the liquid phase of the two components. Once solidified, the two components are metallurgically joined, and the chemical composition of the weld often differs from that of the base material. During these processes, the heat input from the energy source can alter the chemistry and microstructure of the base material, resulting in a region of material, separating the weld from the base material, known as the Heat Affected Zone (HAZ). Thus, the weld can be characterized by three distinct zones, including the weld or fusion zone (FZ), the HAZ, and the base material, often with significant differences in microstructure and mechanical properties. Most notably, the microstructure and mechanical properties of the FZ will resemble that of a cast alloy and will often have much lower strength than the base material. The heat input into the weld is enough to coarsen or recrystallize the adjacent grains in the HAZ, diminishing the properties in this region below that of the base material. The base material is unaffected by the weld and maintains the properties of the starting material.

When conventional 7000-series aluminum alloys are welded, and particularly those bearing copper as an alloying element, grain growth is uninhibited and phase segregation results in liquation cracks forming between solid and liquid phases, and hot cracking results from the unrefined grain structure's inability to tolerate the extreme internal stresses which develop during the welding process. Thus, 7000-series aluminum alloys, such as AA7050 and AA7075, are generally recognized by those skilled in the art as being impossible to weld.

Additive manufacturing, commonly referred to as 3D printing, generally describes a method of forming a net-shape, or near-net-shape, component in an additive manner, where material is deposited one layer at a time until the desired three-dimensional shape is achieved, and there is very little wasted material or scrap resulting from these methods. This contrasts with conventional "subtractive manufacturing" where material is removed from a larger preform, e.g., milling, until the final three-dimensional shape is achieved, and there is generally a lot of wasted material and scrap in these methods.

Additive manufacturing of metals typically utilizes spherical metal alloy powders and uses a focused energy source, such as a laser beam or an electron beam, to fuse the metal powders at specific locations to fabricate a near-net-shape component with high spatial resolution. The spherical metal powders are typically made by gas-atomization or plasma-atomization, which naturally produces spherical powders, or by plasma spherization, which transforms irregular particles into spherical powders. Typically, during these additive manufacturing techniques, the metal powders are fully melted by the energy source and solidify rapidly so that they are fused to the underlying material, which may be a preexisting substrate or a previously deposited layer of the powder material. To achieve a part with desirable relative density, i.e., >99%, multiple layers of deposited material are re-melted, typically more than once, so that there is complete fusion between each layer of deposited material. During these processes, the molten alloy solidifies rapidly, easily exceeding cooling rates of $10^{3°}$ C./sec and as high as $10^{6°}$ C./sec. This cooling rate greatly exceeds those experienced during conventional casting of molten alloys which are typically on the order of $10^0$ to $10^{2o}$ C./sec. Because of the very high cooling rates inherent to additive manufacturing techniques, they are considered far-from-equilibrium, and conventional alloys, which have been optimized for equilibrium processing, cannot be easily processed by such methods.

When conventional 7000-series aluminum alloys are processed by additive manufacturing methods, grain growth is uninhibited, and phase segregation results in liquation cracks forming between solid and liquid phases, and hot cracking results from the unrefined grain structure's inability to tolerate the extreme internal stresses which develop during the additive manufacturing method. Thus, conventional 7000-series aluminum alloys, such as AA7050 and AA7075, are generally recognized by those skilled in the art as being near impossible to additively manufacture. The solution to both challenges is to refine the size of the grains in the solidified material.

An attempt to address this issue is by the use of nanoparticles. Nanoparticles can be used to coat the surface of the metal alloy powder, which are then incorporated in the molten alloy during additive manufacturing. These nanoparticles blunt dendrite growth, and thus inhibit grain growth, effectively refining the grain size in the fabricated solid, so that liquation cracking and hot tearing are avoided, and a dense, defect-free component can be fabricated from an otherwise difficult-to-process alloy. However, the process by which the metal alloys powders are coated with nanoparticles adds cost and complexity to the production of metal alloy powders for additive manufacturing, and is thus not considered an ideal art for large-scale and economical production of metal alloy powders to be used in an additive manufacturing method.

7000-series aluminum alloy powder, which requires scandium (Sc) in addition to optional other elements have been prepared and utilized in an additive manufacturing process. See e.g. Lenczowski (US 2017/0233857 A1). However, scandium is known to be very expensive (about ten times as expensive as silver) and its availability is also limited. Thus, using scandium drastically increases the cost of the powdered alloy, thus limiting its usage for mass applications.

Generally, an improved method is needed which refines the grain size (measured in accordance with ASTM E112) in a welded or an additively manufactured component fabricated from an aluminum alloy, and specifically a 7000-series aluminum alloy, which has desirable properties. Preferably, this method can be accomplished by an alloy chemistry and would not require a secondary step to incorporate nanoparticles into the weld or additively manufactured component. In addition, this method should avoid the use of expensive scandium as an added metal element.

Additionally, it is not only desirable for a 7000-series aluminum alloy to be processed by these methods, but to have an alloy which exceeds the performance of an existing alloy. In other words, it may be desirable to adapt a known 7000-series aluminum alloy, such as AA7075, to overcome the challenges associated with welding and additive manufacturing, but it is more desirable to achieve even higher performance from an alloy based on the Al—Zn—Mg or Al—Zn—Mg—Cu systems.

High-strength conventional 7000-series aluminum alloys are typically known to be unweldable. In contrast, the disclosed alloys are advantageous for, but not limited to, forming ultra-high-strength and weldable aluminum alloys, which can be welded to components having the same alloy compositions, with or without filler material (i.e., weld feed material or weld wire). The filler material can also have the same alloy compositions as the parent materials. Also, the disclosed alloys are especially advantageous for, but not limited to, powder based additive manufacturing techniques, such as laser powder bed fusion, directed energy deposition, laser engineered net shaping, and laser cladding, and wire-based additive manufacturing techniques, such as wire-arc additive manufacturing. It is notoriously difficult to process 7000-series aluminum alloys by these methods because they tend to fail due to liquation-cracking and hot-tearing, stemming from these alloys inability to be welded. The disclosed alloys have been specifically designed to overcome these challenges so that they are easily processed by such methods where rapid melting and solidification are inherent to the processing. Additionally, the disclosed alloys are advantageous for improving the strength as measured in accordance with ASTM E8/E8M and thermal stability (defined specifically as the stability of grain size) of structural components fabricated from conventional 7000-series, either in powder or wrought product form, because the disclosed alloys form a secondary precipitation-strengthening phase at elevated temperatures which conventional alloys do not. This new phase is responsible for an increase in strength and enables the alloy to resist recrystallization at high temperatures. Lastly, the disclosed alloys are advantageous for conventional powder metallurgy techniques, such as hot isostatic pressing, powder molding, and extrusion. During these techniques, the disclosed alloy again precipitates a non-conventional strengthening phase at elevated temperatures (for example, $Al_3Zr$), which increases the strength of the alloy and improves thermal stability by resisting recrystallization. These non-conventional precipitates are in addition to the conventional precipitates which strengthen 7000-series aluminum alloys (for example, $Zn_2Mg$). Thus, the disclosed alloys are, for example, advantageous for improving the performance of structural components in aerospace and automotive applications, in sporting and leisure equipment, and in consumer goods.

Definitions

As used herein, "conventional 7000-series aluminum alloy" refers to an aluminum alloy where zinc (Zn) is the primary alloying element and magnesium is present in smaller amounts. Other elements such as copper, silicon, and iron may also be added in small quantities. Conventional 7000-series aluminum alloys are characterized as being heat-treatable, high-strength materials. Examples of commonly known 7000-series aluminum alloys include AA7070 and AA7075.

As used herein, "grain growth" refers to an increase in the size of grains in solid aluminum.

As used herein, "liquation cracking" or "hot cracking" refers to the formation of shrinkage cracks during the solidification of the weld metal.

As used herein, "solid solution" refers to a solid mixture containing a minor component uniformly distributed within the crystal lattice of the major component. This is distinguished from a mechanical mixture of two or more solids that have a total or partial miscibility gap in solid state.

As used herein, "component" refers to a net-shape or near-net-shape metal structure fabricated from an aluminum alloy or aluminum alloy powder.

As used herein, "additive manufacturing" (AM) refers to any process which results in a three-dimensional object and includes a step of sequentially forming the shape of the object one layer at a time. For example, AM processes include three-dimensional printing (3DP) processes, laser-net-shape manufacturing, direct metal laser sintering (DMLS), direct metal laser melting (DMLM), plasma transferred arc, freeform fabrication, etc. A non-limiting particular type of AM process uses an energy beam, for example, an electron beam or electromagnetic radiation such as a laser beam, to sinter or melt a powder material. AM processes can employ metal powder materials or wire as a raw material.

The embodiments described herein relate to Al—Zn—Mg-based aluminum alloys, which have been alloyed further with transition metal or rare earth metal elements, and which may include copper and/or an inoculant (Sn, In, or Sb), so that the alloys have high strength, improved thermal stability, and superior weldability. Accordingly, in some embodiments, the aluminum alloys of the present disclosure are heat-treatable aluminum alloys.

Alloy Compositions

In some embodiments of the present disclosure, an aluminum alloy is provided that comprises about 4 to about 12% by weight zinc, about 1 to about 4% by weight magnesium, about 0.3 to about 2% by weight of a transition metal element or a rare earth element; and aluminum as the remainder, wherein the alloy does not comprise any intentionally added scandium. In some embodiments, the alloy possesses a strength to weight ratio at room temperature which is at least as great as that of a conventional 7000-series aluminum alloy. In some embodiments, the alloy can be used in a welding process substantially without resulting liquation-cracking and hot-tearing that would result from using the conventional 7000-series aluminum alloy in the welding process. In some embodiments, the transition metal or rare earth metal is selected from the group consisting of Ti, Zr, Hf, V, Nb, Ta, Cr, Mo, W, Mn, Y, La, Ce, Pr, Nd, Pm, Sm, Gd, Tb, Dy, Ho, Er, Tm, Yb, and Lu. In some embodiments, the transition metal is selected from the group consisting of Ti, Zr, Hf, V, Nb, Ta, Cr, Mo, W, Mn, and Y. In some embodiments, the transition metal is selected from the group consisting of Ti, Hf, V, Nb, Ta, Cr, Mo, W, Mn, and Y. In some embodiments, the transition metal element in the disclosed aluminum alloy is selected from the group consisting of Ti, Zr, Hf, and V. In some embodiments, the rare earth metal is selected from the group consisting of La, Ce, Pr, Nd, Pm, Sm, Gd, Tb, Dy, Ho, Er, Tm, Yb, and Lu. In some embodiments, the rare earth metal is selected from the group consisting of La, Ce, Pr, Nd, Gd, Dy, Er, and Yb.

In some embodiments of the present disclosure, an aluminum alloy is provided that consists essentially of about 4 to about 12% by weight zinc, about 1 to about 4% by weight magnesium, about 0.3 to about 2% by weight of a transition metal element or a rare earth element; and aluminum as the remainder, wherein the alloy does not comprise any intentionally added scandium. In some embodiments, the alloy possesses a strength to weight ratio at room temperature which is at least as great as that of a conventional 7000-series aluminum alloy. In some embodiments, the alloy can be used in a welding process substantially without resulting liquation-cracking and hot-tearing that would result from using the conventional 7000-series aluminum alloy in the welding process. In some embodiments, the transition metal or rare earth metal is selected from the group consisting of Ti, Zr, Hf, V, Nb, Ta, Cr, Mo, W, Mn, Y, La, Ce, Pr, Nd, Pm, Sm, Gd, Tb, Dy, Ho, Er, Tm, Yb, and Lu. In some embodiments, the aluminum alloy comprises about 0.3 to about 2% of a transition metal element. In some embodiments, the transition metal is selected from the group consisting of Ti, Zr, Hf, V, Nb, Ta, Cr, Mo, W, Mn, and Y. In some embodiments, the transition metal is selected from the group consisting of Ti, Hf, V, Nb, Ta, Cr, Mo, W, Mn, and Y. In some embodiments, the transition metal element in the disclosed aluminum alloy is selected from the group consisting of Ti, Zr, Hf, and V. In some embodiments, the rare earth metal is selected from the group consisting of La, Ce, Pr, Nd, Pm, Sm, Gd, Tb, Dy, Ho, Er, Tm, Yb, and Lu. In some embodiments, the rare earth metal is selected from the group consisting of La, Ce, Pr, Nd, Gd, Dy, Er, and Yb.

In some embodiments of the present disclosure, an aluminum alloy that consists essentially of about 4 to about 12% by weight zinc, about 1 to about 4% by weight magnesium, about 0.3 to about 2% by weight of a transition metal element or a rare earth element; and aluminum as the remainder, wherein the alloy does not comprise any intentionally added scandium further comprises metallic or metalloid impurities. Impurity in this context refers to a metallic or metalloid additive that does not affect the other intended strengthening mechanisms or significantly degrade the material properties of the aluminum alloy. In some embodiments, the impurities in the disclosed aluminum alloy are silicon and/or iron. In some embodiments, the silicon and/or iron impurities in the disclosed aluminum alloys are present in an amount that does not exceed about 0.5% by weight. In some embodiments, the silicon and/or iron impurities in the disclosed aluminum alloys are present in an amount that does not exceed about 0.3% by weight. In some embodiments, the silicon and/or iron impurities are present in the disclosed aluminum alloys in an amount that does not exceed about 0.1%. Without being bound by any particular theory, it was found that a high concentration (i.e., a concentration exceeding about 0.5% by weight) of impurity or combination of impurities (i.e., silicon and/or iron) will form detrimental intermetallic phases in the aluminum matrix that negatively affect the mechanical properties of the aluminum alloys disclosed herein.

In some embodiments of the present disclosure, an aluminum alloy is provided that comprises about 4 to about 12% by weight zinc, about 1 to about 4% by weight magnesium, about 0.3 to about 2% by weight of a transition metal element; and aluminum as the remainder, wherein the alloy does not comprise any intentionally added scandium. In some embodiments, the alloy possesses a strength to weight ratio at room temperature which is at least as great as that of a conventional 7000-series aluminum alloy. In some embodiments, the alloy can be used in a welding process substantially without resulting liquation-cracking and hot-tearing that would result from using the conventional 7000-series aluminum alloy in the welding process. In some embodiments, the transition metal is selected from the group consisting of Ti, Zr, Hf, V, Nb, Ta, Cr, Mo, W, Mn, and Y. In some embodiments, the transition metal is selected from the group consisting of Ti, Hf, V, Nb, Ta, Cr, Mo, W, Mn, and Y. In some embodiments, the transition metal element in the disclosed aluminum alloy is selected from the group consisting of Ti, Zr, Hf, and V. In some embodiments, the transition metal is Zr.

In some embodiments of the present disclosure, an aluminum alloy is provided that comprises about 4 to about 12% by weight zinc, about 1 to about 4% by weight magnesium, about 0.3 to about 2% by weight of a rare earth element; and aluminum as the remainder, wherein the alloy does not comprise any intentionally added scandium. In some embodiments, the alloy possesses a strength to weight ratio at room temperature which is at least as great as that of a conventional 7000-series aluminum alloy. In some embodiments, the alloy can be used in a welding process substantially without resulting liquation-cracking and hot-tearing that would result from using the conventional 7000-series aluminum alloy in the welding process. In some embodiments, the rare earth metal is selected from the group consisting of La, Ce, Pr, Nd, Pm, Sm, Gd, Tb, Dy, Ho, Er, Tm, Yb, and Lu. In some embodiments, the rare earth metal is selected from the group consisting of La, Ce, Pr, Nd, Gd, Dy, Er, and Yb.

In some embodiments, the amount of zinc in the disclosed alloy is from about 4 to about 12% by weight zinc, e.g., about 4%, about 4.5%, about 5%, about 5.5%, about 6%, about 6.5%, about 7%, about 7.5%, about 8%, about 8.5%, about 9%, about 9.5%, about 10%, about 10.5%, about 11%, about 11.5%, or about 12%, including all ranges and values therebetween. In some embodiments, the alloys of the present disclosure comprise about 5 to about 12% by weight zinc, about 6 to about 12% by weight zinc, about 7 to about 12%, about 8 to about 12%, about 9 to about 12%, about 10 to about 12%, about 5 to about 11%, about 6 to about 11%, about 7 to about 11%, about 8 to about 11%, about 4 to about 10%, about 5 to about 10%, about 6 to about 10%, about 7 to about 10%, about 8 to about 10%, about 4 to about 9%, about 5 to about 9%, about 6 to about 9%, about 7 to about 9%, about 4 to about 8%, about 5 to about 8%, about 6 to about 8%, about 4 to about 7%, about 5 to about 7%, about 4 to about 6%, including all ranges and values therebetween. In some embodiments, the amount of zinc in the disclosed alloy is from about 7 to about 12% by weight zinc. In some embodiments, the amount of zinc in the disclosed alloy is from about 7 to about 11% by weight zinc. In some embodiments, the amount of zinc in the disclosed alloy is from about 7 to about 10% by weight zinc. In some embodiments, the amount of zinc in the disclosed alloy is from about 7 to about 9% by weight zinc. In some embodiments, the amount of zinc in the disclosed alloy is from about 8 to about 12% by weight zinc. In some embodiments, the amount of zinc in the disclosed alloy is from about 8 to about 11% by weight zinc. In some embodiments, the amount of zinc in the disclosed alloy is from about 8 to about 10% by weight zinc. In some embodiments, the amount of zinc in the disclosed alloy is about 5 to about 11% by weight zinc. In some embodiments, the amount of zinc in the disclosed alloy is about 5 to about 10% by weight zinc. In some embodiments, the amount of zinc in the disclosed alloy is about 5 to about 9% by weight zinc. In some embodiments, the amount of zinc in the disclosed alloy is about 5 to about 8% by weight zinc. In some embodiments, the amount of zinc in the disclosed alloy is about 5 to about 7% by weight zinc. In some embodiments, the amount of zinc in the disclosed alloy is about 6 to about 12% by weight zinc. In some embodiments, the amount of zinc in the disclosed alloy is about 6 to about 11% by weight zinc. In some embodiments, the amount of zinc in the disclosed alloy is about 6 to about 10% by weight zinc. In some embodiments, the amount of zinc in the disclosed alloy is about 6 to about 9% by weight zinc. In some embodiments, the amount of zinc in the disclosed alloy is about 6 to about 8% by weight zinc. In some embodiments, the amount of zinc in the disclosed alloy is about 5 to about 10% by weight zinc. In some embodiments, the amount of zinc in the disclosed alloy is about 5 to about 9% by weight zinc. In some embodiments, the amount of zinc in the disclosed alloy is about 5 to about 8% by weight zinc. In some embodiments, the amount of zinc in the disclosed alloy is about 10% by weight zinc. In some embodiments, the amount of zinc in the disclosed alloy is about 11% by weight zinc. In some embodiments, the amount of zinc in the disclosed alloy is about 12% by weight zinc. In some embodiments, In some embodiments, the amount of magnesium in the disclosed alloy is from about 1 to about 4% by weight magnesium, e.g., about 1%, about 1.25%, about 1.5%, about 1.75%, about 2%, about 2.25%, about 2.5%, about 2.75%, about 3%, about 3.25%, about 3.5%, about 3.75%, or about 4%, including all ranges and values therebetween. In some embodiments, the amount of magnesium in the disclosed alloy is from about 1 to about 3% by weight magnesium. In some embodiments, the amount of magnesium in the disclosed alloy is from about 2 to about 4% by weight magnesium In some embodiments, the amount of magnesium in the disclosed alloy is about 1.5% by weight magnesium. In some embodiments, the amount of magnesium in the disclosed alloy is about 2% by weight magnesium. In some embodiments, the amount of magnesium in the disclosed alloy is about 2.5% by weight magnesium. In some embodiments, the amount of magnesium in the disclosed alloy is about 3% by weight magnesium. In some embodiments, the amount of magnesium in the disclosed alloy is about 3.5% by weight magnesium. In some embodiments, the amount of magnesium in the disclosed alloy is about 4% by weight magnesium.

In some embodiments, the transition metal element or rare earth metal element in the disclosed aluminum alloy is selected from the group consisting of titanium (Ti), hafnium (Hf), vanadium (V), niobium (Nb), tantalum (Ta), chromium (Cr), molybdenum (Mo), tungsten (W), manganese (Mn), yttrium (Y), lanthanum (La), cerium (Ce), praseodymium (Pr), neodymium (Nd), promethium (Pm), samarium (Sm), gadolinium (Gd), terbium (Tb), dysprosium (Dy), holmium (Ho), erbium (Er), thulium (Tm), ytterbium (Yb), and lutetium (Lu), or combinations thereof. In some embodiments, the amount of transitional metal elements or rare earth elements present in the disclosed alloy is from about 0.3 to about 2% by weight of the metal, e.g., about 0.3%, about 0.4%, about 0.5%, about 0.6%, about 0.7%, about 0.8%, about 0.9%, about 1.0%, about 1.1%, about 1.2%, about 1.3%, about 1.4%, about 1.5%, about 1.6%, about 1.7%, about 1.8%, about 1.9%, or about 2% by weight of the metal, including all ranges and values therebetween. In some embodiments, the amount of transitional metal elements or rare earth elements present in the disclosed alloy is from about 0.3 to about 1% by weight of the metal. In some embodiments, the amount of transitional metal elements or rare earth elements present in the disclosed alloy is from about 0.3 to about 0.7% by weight of the metal. In some embodiments, the amount of transitional metal elements or rare earth elements present in the disclosed alloy is from about 1 to about 2% by weight of the metal. In some embodiments, the amount of transitional metal elements or rare earth elements present in the disclosed alloy is from about 1 to about 1.5% by weight of the metal. In some embodiments, the amount of transitional metal elements or rare earth elements present in the disclosed alloy is from about 1.25 to about 1.75% by weight of the metal. In some embodiments, the amount of transitional metal elements or rare earth elements present in the disclosed alloy is from about 1.4 to about 1.6% by weight of the metal. In some embodiments, the amount of transitional metal elements or rare earth elements present in the disclosed alloy is from about 1.5 to about 2% by weight of the metal. In some embodiments, the amount of transitional metal elements or rare earth elements present in the disclosed alloy is from about 0.1 to about 1% by weight of the metal, e.g., about 0.1%, about 0.15%, about 0.2%, about 0.25%, about 0.3%, about 0.35%, about 0.4%, about 0.45%, about 0.5%, about 0.55%, about 0.6%, about 0.65%, about 0.7%, about 0.75%, about 0.8%, about 0.85%, about 0.9%, about 0.95%, or about 1% by weight of the metal, including all ranges and values therebetween. In some embodiments, the amount of transitional metal elements or rare earth elements present in the disclosed alloy is from about 0.1 to about 0.5% by weight of the metal. In some embodiments, the amount of transitional metal elements or rare earth elements present in the disclosed alloy is from about 0.6 to about 1% by weight of the metal. In some embodiments, the amount of transitional metal elements or rare earth elements present in the disclosed aluminum alloy is greater than about 0.5% by weight of the metal. In some embodiments, the amount of transitional metal elements or rare earth elements present in the disclosed aluminum alloy is about 1.0% by weight of the metal. In some embodiments, the amount of transitional metal elements or rare earth elements present in the disclosed aluminum alloy is about 1.5% by weight of the metal. In some embodiments, the amount of transitional metal elements or rare earth elements present in the disclosed aluminum alloy is about 2.0% by weight of the metal.

In some embodiments, the rare earth metal is selected from the group consisting of La, Ce, Pr, Nd, Pm, Sm, Gd, Tb, Dy, Ho, Er, Tm, Yb, and Lu. In some embodiments, the rare earth metal is selected from the group consisting of La, Ce, Pr, Nd, Gd, Dy, Er, and Yb. In some embodiments, the amount of rare earth metal present in the disclosed alloy is from about 0.3 to about 2% by weight, e.g., about 0.3%, about 0.4%, about 0.5%, about 0.6%, about 0.7%, about 0.8%, about 0.9%, about 1.0%, about 1.1%, about 1.2%, about 1.3%, about 1.4%, about 1.5%, about 1.6%, about 1.7%, about 1.8%, about 1.9%, or about 2% by weight of the rare earth metal, including all ranges and values therebetween. In some embodiments, the amount of the rare earth metal present in the disclosed alloy is from about 1 to about 2% by weight, including all ranges and values therebetween. In some embodiments, the amount of the rare earth elements present in the disclosed alloy is from about 0.3 to about 1% by weight of the metal. In some embodiments, the amount of the rare earth elements present in the disclosed alloy is from about 0.3 to about 0.7% by weight of the metal. In some embodiments, the amount of the rare earth elements present in the disclosed alloy is from about 1 to about 2% by weight of the metal. In some embodiments, the amount of the rare earth elements present in the disclosed alloy is from about 1 to about 1.5% by weight of the metal. In some embodiments, the amount of the rare earth elements present in the disclosed alloy is from about 1.25 to about 1.75% by weight of the metal. In some embodiments, the amount of the rare earth elements present in the disclosed alloy is from about 1.4 to about 1.6% by weight of the metal. In some embodiments, the amount of the rare earth elements present in the disclosed alloy is from about 1.5 to about 2% by weight of the metal. In some embodiments, the amount of the rare earth metal present in the disclosed alloy is about 1.0% by weight. In some embodiments, the amount of the rare earth metal present in the disclosed alloy is about 1.5% by weight. In some embodiments, the amount of the rare earth metal present in the disclosed alloy is about 2.0% by weight.

In some embodiments, the transition metal element in the disclosed aluminum alloy is selected from the group consisting of Ti, Zr, Hf, V, Nb, Ta, Cr, Mo, W, Mn, and Y. In some embodiments, the transition metal element in the disclosed aluminum alloy is selected from the group consisting of Ti, Hf, V, Nb, Ta, Cr, Mo, W, Mn, and Y. In some embodiments, the transition metal element in the disclosed aluminum alloy is selected from the group consisting of Ti, Hf, and V. In some embodiments, the amount of transition metal present in the disclosed alloy is from about 0.3 to about 2% by weight, e.g., about 0.3%, about 0.4%, about 0.5%, about 0.6%, about 0.7%, about 0.8%, about 0.9%, about 1.0%, about 1.1%, about 1.2%, about 1.3%, about 1.4%, about 1.5%, about 1.6%, about 1.7%, about 1.8%, about 1.9%, or about 2% by weight of the transition metal, including all ranges and values therebetween. In some embodiments, the amount of transition metal present in the disclosed alloy is from about 1 to about 2% by weight, including all ranges and values therebetween. In some embodiments, the amount of transitional metal elements present in the disclosed alloy is from about 0.3 to about 1% by weight of the metal. In some embodiments, the amount of transitional metal elements in the disclosed alloy is from about 0.3 to about 0.7% by weight of the metal. In some embodiments, the amount of transitional metal elements in the disclosed alloy is from about 1 to about 2% by weight of the metal. In some embodiments, the amount of transitional metal elements in the disclosed alloy is from about 1 to about 1.5% by weight of the metal. In some embodiments, the amount of transitional metal elements in the disclosed alloy is from about 1.25 to about 1.75% by weight of the metal. In some embodiments, the amount of transitional metal elements in the disclosed alloy is from about 1.4 to about 1.6% by weight of the metal. In some embodiments, the amount of transitional metal elements in the disclosed alloy is from about 1.5 to about 2% by weight of the metal. In some embodiments, the amount of the transition metal present in the disclosed alloy is about 1.0% by weight. In some embodiments, the amount of the transition metal present in the disclosed alloy is about 1.5% by weight. In some embodiments, the amount of the transition metal present in the disclosed alloy is about 2.0% by weight.

In some embodiments, the transition metal element in the disclosed aluminum alloy is zirconium (Zr). In some embodiments, the amount of zirconium present in the disclosed alloy is from about 0.3 to about 2% by weight zirconium, e.g., about 0.3%, about 0.4%, about 0.5%, about 0.6%, about 0.7%, about 0.8%, about 0.9%, about 1.0%, about 1.1%, about 1.2%, about 1.3%, about 1.4%, about 1.5%, about 1.6%, about 1.7%, about 1.8%, about 1.9%, or about 2% by weight Zr, including all ranges and values therebetween. In some embodiments, the amount of zirconium present in the disclosed alloy is from about 1 to about 2% by weight zirconium, including all ranges and values therebetween. In some embodiments, the amount of zirconium present in the disclosed alloy is from about 0.3 to about 1% by weight of zirconium. In some embodiments, the amount of zirconium present in the disclosed alloy is from about 0.3 to about 0.7% by weight of zirconium. In some embodiments, the amount of zirconium present in the disclosed alloy is from about 1 to about 2% by weight of zirconium. In some embodiments, the amount of zirconium present in the disclosed alloy is from about 1 to about 1.5% by weight of zirconium. In some embodiments, the amount of zirconium present in the disclosed alloy is from about 1.25 to about 1.75% by weight of zirconium. In some embodiments, the amount of zirconium present in the disclosed alloy is from about 1.4 to about 1.6% by weight of zirconium. In some embodiments, the amount of zirconium present in the disclosed alloy is from about 1.5 to about 2% by weight of zirconium. In some embodiments, the amount of zirconium present in the disclosed alloy is about 1.0% by weight Zr. In some embodiments, the amount of zirconium present in the disclosed alloy is about 1.5% by weight Zr. In some embodiments, the amount of zirconium present in the disclosed alloy is about 2.0% by weight Zr.

In some embodiments, the alloy is differentiated from the conventional 7000-series alloys by the further addition of a transition metal element, a rare earth element, or a lanthanide, excluding Sc. In some embodiments, the total addition of Ti, Zr, Hf, V, Nb, Ta, Cr, Mo, W, Y, La, Ce, Pr, Nd, Gd, Dy, Er, Tm, Yb, Lu or combinations thereof to the alloy is from about 0.05 to about 0.8 atomic percent (at. %). In some embodiments, the total addition of Ti, Zr, Hf, V, Nb, Ta, Cr, Mo, W, Y, La, Ce, Pr, Nd, Gd, Dy, Er, Tm, Yb, Lu or combinations thereof to the alloy is from about 0.3 to about 0.5 at. %. As shown in Table 1, these concentrations greatly exceed the maximum equilibrium solubility limit of these elements in solid aluminum, which is less than about 0.1 at. % for most of these elements.

TABLE 1

| Element | Max $C_{Equilibrium}$ (at. %) [Knipling] |
| --- | --- |
| Sc | 0.23 |
| Y | 0.049 |
| Ti | 0.79 |
| Zr | 0.083 |
| Hf | 0.186 |
| V | 0.33 |
| Nb | 0.066 |
| Ta | 0.235 |
| Er | ≈0 |
| Tm | ≈0 |
| Yb | 0.18 |
| Lu | ≈0 |

Knipling, Keith E., David C. Dunand, and David N. Seidman. "Criteria for developing castable, creep-resistant aluminum-based alloys-A review." Zeitschrift fir Metallkunde 97, no. 3 (2006): 246-265.

Accordingly, in some embodiments, the present disclosure provides an aluminum alloy comprising: about 4 to about 12% by weight zinc; about 1 to about 4% by weight magnesium; about 0.3 to about 2% by weight zirconium; and aluminum as the remainder, wherein the alloy does not comprise any intentionally added scandium (Sc). In some embodiments, the alloy possesses a strength to weight ratio at room temperature which is at least as great as that of a conventional 7000-series aluminum alloy. In some embodiments, the alloy can be used in a welding process substantially without resulting in liquation-cracking and hot-tearing that would result from using the conventional 7000-series aluminum alloy in the welding process.

In some embodiments, the present disclosure provides an aluminum alloy comprising: about 4 to about 12% by weight zinc; about 1 to about 4% by weight magnesium; about 0.3 to about 2% by weight of titanium, hafnium, vanadium, niobium, tantalum, chromium, molybdenum, tungsten, manganese, yttrium, lanthanum, cerium, praseodymium, neodymium, promethium, gadolinium, terbium, dysprosium, holmium, erbium, thulium, ytterbium or lutetium, or a combination thereof; and aluminum as the remainder, wherein the alloy does not comprise any intentionally added scandium (Sc). In some embodiments, the alloy possesses a strength to weight ratio at room temperature which is at least as great as that of a conventional 7000-series aluminum alloy. In some embodiments, the alloy can be used in a welding process substantially without resulting in liquation-cracking and hot-tearing that would result from using the conventional 7000-series aluminum alloy in the welding process.

In some embodiments, an aluminum alloy comprising about 4 to about 12% by weight zinc; about 1 to about 4% by weight magnesium; about 0.3 to about 2% by weight zirconium, further comprise about 0.1 to about 1% by weight of titanium, hafnium, vanadium, niobium, tantalum, chromium, molybdenum, tungsten, manganese, yttrium, lanthanum, cerium, praseodymium, neodymium, promethium, gadolinium, terbium, dysprosium, holmium, erbium, thulium, ytterbium or lutetium, or combinations thereof; and aluminum as the remainder, wherein the alloy possesses a strength to weight ratio at room temperature which is at least as great as that of a conventional 7000-series aluminum alloy; wherein the alloy can be used in a welding process substantially without resulting liquation-cracking and hot-tearing that would result from using the conventional 7000-series aluminum alloy in the welding process; and wherein the alloy does not comprise any intentionally added scandium. In some embodiments, the amount of titanium, hafnium, vanadium, niobium, tantalum, chromium, molybdenum, tungsten, manganese, yttrium, lanthanum, cerium, praseodymium, neodymium, promethium, gadolinium, terbium, dysprosium, holmium, erbium, thulium, ytterbium or lutetium, or combinations thereof is about 0.1%, about 0.15%, about 0.2%, about 0.25%, about 0.3%, about 0.35%, about 0.4%, about 0.45%, about 0.5%, about 0.55%, about 0.6%, about 0.65%, about 0.7%, about 0.75%, about 0.8%, about 0.85%, about 0.9%, about 0.95%, or about 1% by weight of the metal, including all ranges and values therebetween.

As described herein, the disclosed alloys are free of scandium. In some embodiments, no scandium is intentionally added to the aluminum alloys disclosed herein. Consequently, in some embodiments, the amount of scandium in the aluminum alloys of the present disclosure is less than about 0.05%, less than about 0.04%, less than about 0.03%, less than about 0.02%, less than about 0.01%, less than about 0.005%, or less than about 0.001% by weight of the total composition. In some embodiments, the amount of scandium in the aluminum alloy is less than about 0.1% by weight of the alloy composition. In some embodiments, the amount of scandium in the aluminum alloy is less than about 0.05% by weight of the alloy composition. In some embodiments, the amount of scandium in the aluminum alloy is less than about 0.02% by weight of the alloy composition. In some embodiments, the amount of scandium in the aluminum alloy is less than about 0.01% by weight of the alloy composition.

In some embodiments, the aluminum alloys of the present disclosure comprise primary precipitates, e.g., Al$_3$Zr, which are believe to further strengthen the alloy. In some embodiments, the primary precipitates have an average diameter of from about 0.05 to about 1.5 μm, e.g., about 0.05 μm, about 0.1 μm, about 0.15 μm, about 0.2 μm, about 0.25 μm, about 0.3 μm, about 0.35 μm, about 0.4 μm, about 0.45 μm, about 0.5 μm, about 0.55 μm, about 0.6 μm, about 0.65 μm, about 0.7 μm, about 0.75 μm, about 0.8 μm, about 0.85 μm, about 0.9 μm, about 0.95 μm, about 1.00 μm, about 1.05 μm, about 1.1 μm, about 1.15 μm, about 1.2 μm, about 1.25 μm, about 1.3 μm, about 1.35 μm, about 1.4 μm, about 1.45 μm, or about 1.5 μm, including all ranges and values therebetween. In some embodiments, the primary precipitates have an average diameter ranging from about 0.1 to about 1.5 μm. In some embodiments, the primary precipitates are Al—X primary precipitates. In some embodiments, X is Ti, Zr, Hf, V, Nb, Ta, Cr, Mo, W, Mn, Y, La, Ce, Pr, Nd, Pm, Sm, Gd, Tb, Dy, Ho, Er, Tm, Yb, or Lu. In some embodiments, the primary precipitates are Al$_3$Zr. In some embodiments, when multiple transition metals or rare earth metals are present in the aluminum alloy, the Al—X primary precipitates are Al—$X_1$—$X_2$, Al—$X_1$—$X_2$—$X_3$, etc. primary precipitates, wherein $X_1$, $X_2$, and $X_3$ and so forth each represent a different transition metal or rare earth metal.

In some embodiments, the primary precipitates are nanoscale precipitates having an average diameter of from about 1 to about 100 nm, e.g., about 1 nm, about 2 nm, about 4 nm, about 6 nm, about 8 nm, about 10 nm, about 12 nm, about 14 nm, about 16 nm, about 18 nm, about 20 nm, about 22 nm, about 24 nm, about 26 nm, about 28 nm, about 30 nm, about 32 nm, about 34 nm, about 36 nm, about 38 μm, about 40 μm, about 42 nm, about 44 μm, about 46 nm, about 48 nm, about 50 nm, about 52 nm, about 54 μm, about 56 nm, about 58 μm, about 60 nm, about 62 nm, about 64 nm, about 66 nm, about 68 μm, about 70 nm, about 72 nm, about 74 nm, about 76 nm, about 78 nm, about 80 nm, about 82 nm, about 84 nm, about 86 nm, about 88 nm, about 90 num, about 92 nm, about 94 nm, about 96 nm, about 98 nm, or about 100 nm, including all ranges and values therebetween. In some embodiments, the nano-scale precipitates have an average diameter of from about 3 to about 50 μm. In some embodiments, the nano-scale precipitates have an average diameter of from about 3 to about 20 nm. In some embodiments, the nano-scale precipitates are Al—X nano-scale precipitates. In some embodiments, X is Ti, Zr, Hf, V, Nb, Ta, Cr, Mo, W, Mn, Y, La, Ce, Pr, Nd, Pm, Sm, Gd, Tb, Dy, Ho, Er, Tm, Yb, or Lu. In some embodiments, the nano-scale precipitates are $Al_3Zr$. In some embodiments, when multiple transition metals or rare earth metals are present in the aluminum alloy, the Al—X nano-scale precipitates are Al—$X_1$—$X_2$, Al—$X_1$—$X_2$—$X_3$, etc. nano-scale precipitates, wherein $X_1$, $X_2$, and $X_3$ and so forth each represent a different transition metal or rare earth metal.

In some embodiments, the nano-scale precipitates Al—X (or Al-X-$X_2$, Al-X-$X_2$—$X_3$, etc.) with an $L1_2$ crystal structure have an average diameter ranging from about 1 to about 100 nm, e.g., about 1 nm, about 2 μm, about 4 nm, about 6 nm, about 8 nm, about 10 nm, about 12 nm, about 14 nm, about 16 μm, about 18 nm, about 20 nm, about 22 nm, about 24 nm, about 26 nm, about 28 μm, about 30 μm, about 32 nm, about 34 nm, about 36 nm, about 38 nm, about 40 nm, about 42 nm, about 44 nm, about 46 nm, about 48 nm, about 50 nm, about 52 nm, about 54 nm, about 56 nm, about 58 nm, about 60 nm, about 62 nm, about 64 nm, about 66 nm, about 68 nm, about 70 μm, about 72 μm, about 74 nm, about 76 nm, about 78 μm, about 80 nm, about 82 nm, about 84 nm, about 86 μm, about 88 nm, about 90 μm, about 92 nm, about 94 μm, about 96 nm, about 98 nm, or about 100 nm, including all ranges and values therebetween. In some embodiments, the nano-scale precipitates with an $L1_2$ crystal structure have an average diameter ranging from about 3 to about 50 nm. In some embodiments, the nano-scale precipitates with an $L1_2$ crystal structure have an average diameter ranging from about 3 to about 20 nm. Without being bound by any particular theory, it is believed that the formation of these nano-scale precipitates provides an increase in strength over what could be expected from a conventional 7000-series alloy. In some embodiments, X is Ti, Zr, Hf, V, Nb, Ta, Cr, Mo, W, Mn, Y, La, Ce, Pr, Nd, Pm, Sm, Gd, Tb, Dy, Ho, Er, Tm, Yb, or Lu. In some embodiments, the nano-scale precipitates with an $L1_2$ crystal structure are Al3Zn nano-scale precipitates.

In some embodiments, the aluminum alloys of the present disclosure comprise an aluminum matrix with a simultaneous dispersion of Al—X primary precipitates and $Zn_2Mg$ precipitates. In some embodiments, the simultaneous dispersion further comprises nano-scale precipitates Al—X. In some embodiments, X is Ti, Zr, Hf, V, Nb, Ta, Cr, Mo, W, Mn, Y, La, Ce, Pr, Nd, Pm, Sm, Gd, Tb, Dy, Ho, Er, Tm, Yb, or Lu.

The addition of the previously stated elements Ti, Zr, Hf, V, Nb, Ta, Cr, Mo, W, Mn, Y, La, Ce, Pr, Nd, Pm, Sm, Gd, Tb, Dy, Ho, Er, Tm, Yb, or Lu (X) is expected to form thermally stable aluminide intermetallic phases in the metal alloy, i.e. Al—X, and in the case of multiple elements being added, a mixed aluminide phase will form, i.e. Al—($X_1$, $X_2$, $X_3$, etc.). Without being bound by any particular theory, it is believed the purpose of these additional elements and the resulting intermetallic phases is three-fold:

1. These solid intermetallic phases will precipitate from the molten alloy to form primary precipitates, which are about 0.1 to 10 s of micrometers, and which are preferably 0.1 to 1.5 μm in size, and which provide nucleation sites for fcc-Al grains upon solidification, so that the solidified alloy has a refined grain size. In some embodiments, the primary precipitates are about 0.1 to about 1.5 μm. This overcomes some of the generic challenges associated with additive manufacturing.

2. During a post-process heat treatment, these elements will form nano-scale, aluminide precipitates in the solid alloy, which are about 1 to about 100 nm in size or about 3 to about 20 nm. These precipitates provide an increase in strength over what could be expected from a conventional 7000-series alloy. Additionally, these aluminide precipitates generally do not interact with the zinc and magnesium which are present in the alloy, and which form fine-scale, $Zn_2Mg$ precipitates in the solid alloy, which are responsible for the strengthening effect in a conventional 7000-series alloy, so that after the heat treatment, the alloy may be heat treated in a conventional manner to gain the strength which could be expected from a conventional 7000-series alloy.

3. Both the fine-scale, primary precipitates and the nano-scale aluminide precipitates have excellent thermal stability due to the sluggish diffusivity of these elements in solid aluminum. These precipitates improve the thermal stability of the alloy by providing a barrier to recrystallization.

In some embodiments, the disclosed alloys form a non-conventional strengthening phase (e.g., an intermetallic phase such as $Al_3Zr$) at elevated temperatures that is not present in conventional 7000-series alloys. These non-conventional precipitates are in addition to the conventional precipitates which strengthen 7000-series aluminum alloys (for example, $Zn_2Mg$). Without being bound by any particular theory, this new phase is responsible for an increase in strength and improves thermal stability by resisting recrystallization.

In some embodiments, copper is further added to the 7000-series aluminum alloys of the present disclosure. In some embodiments, the amount of copper in the disclosed aluminum alloy is up to about 3% by weight copper. In some embodiments, the amount of copper in the disclosed aluminum alloy is from about 1 to about 4% by weight copper, e.g., about 1%, about 1.25%, about 1.5%, about 1.75%, about 2%, about 2.25%, about 2.5%, about 2.75%, about 3%, about 3.25%, about 3.5%, about 3.75%, or about 4%, including all ranges and values therebetween. In some embodiments, the amount of copper in the disclosed aluminum alloy is from about 0 to about 3% by weight copper. In some embodiments, aluminum alloy of the present disclosure comprises no more than 3% by weight copper. In some embodiments, aluminum alloy of the present disclosure comprises no more than 2% by weight copper. In some embodiments, aluminum alloy of the present disclosure comprises no more than 1% by weight copper. In some embodiments, aluminum alloy of the present disclosure comprises about 1% by weight copper.

In some embodiments, the aluminum alloy of the present disclosure further comprises Sn, In, or Sb, ranging from about 0.001 to about 0.1 at. %, e.g., about 0.001%, about 0.005%, about 0.010%, about 0.015%, about 0.02%, about 0.025, about 0.030%, about 0.035%, about 0.040%, about 0.045%, about 0.050%, about 0.055%, about 0.060%, about 0.065%, about 0.070%, about 0.075%, about 0.080%, about 0.085%, about 0.090%, or about 0.10%, about 0.15%, including all ranges and values therebetween. Without being bound by any particular theory, these minor additions are found to accelerate precipitation kinetics of transition metals.

In some embodiments, the aluminum alloys of the present disclosure further comprise one or more of silicon (Si) and iron (Fe) impurities. In some embodiments, the silicon and/or iron impurities in the disclosed aluminum alloys are present in an amount that does not exceed about 1% by weight, about 0.9% by weight, about 0.8% by weight, about 0.7% by weight, about 0.6% by weight, about 0.5% by weight, about 0.4% by weight, about 0.3% by weight, about 0.2% by weight, or about 0.1% by weight, individually or in combination, including all ranges and values therebetween. In some embodiments, the silicon and/or iron impurities in the disclosed aluminum alloys are present in an amount that does not exceed about 0.5% by weight. In some embodiments, the silicon and/or iron impurities in the disclosed aluminum alloys are present in an amount that does not exceed about 0.3% by weight. In some embodiments, the silicon and/or iron impurities are present in the disclosed aluminum alloys in an amount that does not exceed about 0.1%. Without being bound by any particular theory, it was found that a high concentration (i.e., a concentration exceeding about 0.5% by weight) of impurity or combination of impurities (i.e., silicon and/or iron) will form detrimental intermetallic phases in the aluminum matrix that negatively affect mechanical properties of the aluminum alloys disclosed herein.

In some embodiments, the aluminum alloys of the present disclosure comprise 4 to 12% by weight zinc, 1 to 4% by weight magnesium, optional copper up to about 3% by weight, 0.3 to 2% by weight zirconium, and aluminum as the remainder. In some embodiments, the alloy does not comprise any intentionally added scandium. Accordingly, the amount of scandium is less than about 0.05% or less than about 0.02% by weight.

In some embodiments, the aluminum alloys of the present disclosure comprise 7 to 12% by weight zinc, 2 to 4% by weight magnesium, optional copper up to about 3% by weight, 0.3 to 2% by weight zirconium, and aluminum as the remainder. In some embodiments, the alloy does not comprise any intentionally added scandium. Accordingly, the amount of scandium is less than about 0.05% or less than about 0.02% by weight.

In some embodiments, the aluminum alloys of the present disclosure comprise 5 to 7% by weight zinc, 1 to 4% by weight magnesium, optional copper up to about 3% by weight, 0.3 to 2% by weight zirconium, and aluminum as the remainder. In some embodiments, the alloy does not comprise any intentionally added scandium. Accordingly, the amount of scandium is less than about 0.05% or less than about 0.02% by weight.

In some embodiments, the alloys of the present disclosure comprise about 4 to about 12% by weight zinc, 1 to 4% by weight magnesium, optional copper up to about 3% by weight, 0.3 to 2% by weight zirconium, impurities of manganese, chromium, silicon, and iron that do not exceed about 0.5% by weight, and aluminum as the remainder. In some embodiments, the alloy does not comprise any intentionally added scandium. Accordingly, the amount of scandium is less than about 0.05% or less than about 0.02% by weight.

In some embodiments, the alloys of the present disclosure comprise about 7 to about 12% by weight zinc, 1 to 4% by weight magnesium, optional copper up to about 3% by weight, 0.3 to 2% by weight zirconium, impurities of manganese, chromium, silicon, and iron that do not exceed about 0.5% by weight, and aluminum as the remainder. In some embodiments, the alloy does not comprise any intentionally added scandium. Accordingly, the amount of scandium is less than about 0.05% or less than about 0.02% by weight.

In some embodiments, the alloys of the present disclosure comprise about 5 to about 7% by weight zinc, 1 to 4% by weight magnesium, optional copper up to about 3% by weight, 0.3 to 2% by weight zirconium, impurities of manganese, chromium, silicon, and iron that do not exceed about 0.5% by weight, and aluminum as the remainder. In some embodiments, the alloy does not comprise any intentionally added scandium. Accordingly, the amount of scandium is less than about 0.05% or less than about 0.02% by weight.

In some embodiments, the aluminum alloys of the present disclosure comprise about 4 to about 12% by weight zinc, 1 to 4% by weight magnesium, optional copper up to about 3% by weight, 0.3 to 2% by weight titanium, hafnium, vanadium, niobium, tantalum, chromium, molybdenum, tungsten, manganese, yttrium, lanthanum, cerium, praseodymium, neodymium, promethium, gadolinium, terbium, dysprosium, holmium, erbium, thulium, ytterbium or lutetium, or combinations thereof, impurities of manganese, chromium, silicon, and iron that do not exceed about 0.5% by weight, and aluminum as the remainder. In some embodiments, the alloy does not comprise any intentionally added scandium. Accordingly, the amount of scandium is less than about 0.05% or less than about 0.02% by weight.

In some embodiments, the aluminum alloys of the present disclosure comprise about 7 to about 12% by weight zinc, 1 to 4% by weight magnesium, optional copper up to about 3% by weight, 0.3 to 2% by weight titanium, hafnium, vanadium, niobium, tantalum, chromium, molybdenum, tungsten, manganese, yttrium, lanthanum, cerium, praseodymium, neodymium, promethium, gadolinium, terbium, dysprosium, holmium, erbium, thulium, ytterbium or lutetium, or combinations thereof, impurities of manganese, chromium, silicon, and iron that do not exceed about 0.5% by weight, and aluminum as the remainder. In some embodiments, the alloy does not comprise any intentionally added scandium. Accordingly, the amount of scandium is less than about 0.05% or less than about 0.02% by weight.

In some embodiments, the aluminum alloys of the present disclosure comprise about 5 to about 7% by weight zinc, 1 to 4% by weight magnesium, optional copper up to about 3% by weight, 0.3 to 2% by weight titanium, hafnium, vanadium, niobium, tantalum, chromium, molybdenum, tungsten, manganese, yttrium, lanthanum, cerium, praseodymium, neodymium, promethium, gadolinium, terbium, dysprosium, holmium, erbium, thulium, ytterbium or lutetium, or combinations thereof, impurities of manganese, chromium, silicon, and iron that do not exceed about 0.5% by weight, and aluminum as the remainder. In some embodiments, the alloy does not comprise any intentionally added scandium. Accordingly, the amount of scandium is less than about 0.05% or less than about 0.02% by weight.

In some embodiments, the 7000-series aluminum alloys of the present disclosure further comprise one or more inoculants. In some embodiments, the one or more inoculants is selected from the group consisting of Sn, In, and Sb.

In some embodiments, the aluminum as the reminder is an amount of aluminum from about 77 to about 82%, e.g., about 77.2%, about 77.4%, about 77.6%, about 77.8%, about 78%, about 78.2%, about 78.4%, about 78.6%, about 78.8%, about 79%, about 79.2%, about 79.4%, about 79.6%, about 79.8%, about 80%, about 80.2%, about 80.4%, about 80.6%, about 80.8%, about 81%, about 81.2%, about 81.4%, about 81.6%, about 81.8%, or about 82%, including all ranges and values therebetween. In some embodiments, the aluminum as the reminder is an amount of aluminum from about 78 to about 82%. In some embodiments, the aluminum as the reminder is an amount of aluminum from about 79 to about 82%. In some embodiments, the aluminum as the reminder is an amount of aluminum from about 80 to about 82%. In some embodiments, the aluminum as the reminder is an amount of aluminum from about 80.5 to about 82%. In some embodiments, the aluminum as the reminder is an amount of aluminum from about 81 to about 82%. In some embodiments, the aluminum as the reminder is an amount of aluminum from about 80 to about 81%. In some embodiments, the aluminum as the reminder is an amount of aluminum from about 81.5 to about 82%. In some embodiments, the aluminum as the reminder is an amount of aluminum from about 80.5 to about 81.0%.

The disclosed 7000-series aluminum alloy has been designed to overcome the challenges of welding and additive manufacturing, such as liquation cracking and hot tearing, by undergoing an in situ phase reaction when processed from a molten phase to produce a refined grain size in the final component; such liquid phase processing is inherent to most welding and additive manufacturing processes which utilize an electric arc, laser beam, or electron beam as an energy source. This aluminum alloy, when fabricated into a component, can be heat treated to improve the strength of the component by more than 10%, and in some cases 20%, compared to what is typically obtained from a conventional 7000-series aluminum alloy (e.g. AA7050). In some embodiments, the strength of the component is increased by about 10%, about 12%, about 14%, about 16%, about 18%, or about 20% compared to the strength of a conventional 7000-series aluminum alloy. In some embodiments, the strength is increased from about 10% to about 25% compared to the strength of a conventional 7000-series aluminum alloy. Additionally, this prealloyed metal powder can be processed by such powder metallurgy processes as hot isostatic pressing, powder molding, and extrusion, which do not cause a liquid phase to form during the manufacturing process. When processed by such methods, the alloy has mechanical properties and thermal stability exceeding what is expected from a conventional 7000-series alloy.

In some embodiments, the aluminum alloys of the present disclosure are fabricated into a rod, a wire, a ribbon, chips, a powder, or any other form known in the art. In some embodiments, a rod, a wire, a ribbon, chips, a powder are fabricated from an aluminum alloy of the present disclosure, which is in the form of an ingot or solutionized ingot. In some embodiments, the aluminum alloy is fabricated into a ribbon, chips, or a powder. In some embodiments, the aluminum alloy is fabricated into chips. In some embodiments, the aluminum alloy is fabricated into a rod or a wire. In some embodiments, the aluminum alloy is fabricated into a rod. In some embodiments, the aluminum alloy is fabricated into a wire. In some embodiments, the wire of the present disclosure has an average diameter of from about 0.8 mm to about 5.2 mm, e.g., about 0.8 mm, about 1.2 mm, about 1.6 mm, about 2.0 mm, about 2.4 mm, about 2.8 mm, about 3.2 mm, about 3.6 mm, about 4.0 mm, about 4.4 mm, about 4.8 mm, or about 5.2 mm, including all ranges and values therebetween. In some embodiments, the aluminum alloy is fabricated into a ribbon. In some embodiments, the alloys may be fabricated as a melt-spun ribbon, hot compacted, and extruded into a structure. In some embodiments, the aluminum alloy is fabricated into a powder. In some embodiments, the powder is fabricated by a process selected from the group consisting of gas-atomizing, plasma-atomizing, rotating-electrode processing, or mechanical alloying. In some embodiments, the process further comprises plasma spheroidizing. In some embodiments, the powders are spherical shaped. In some embodiments, spherical particles are desirable because they spread nicely for powder bed methods and flow nicely for powder spray methods. Gas atomization generally gives spherical particles with a wide distribution of diameters. In some embodiments, the powders are irregular shaped. Methods such as air or water atomization generally provide irregular shapes (including, but not limited to ligamental and/or globular.

In some embodiments, the powders of the present disclosure have a particle size ranging from about 1 to about 500 µm, e.g., about 1 µm, about 25 µm, about 50 µm, about 75 µm, about 100 µm, about 125 µm, about 150 µm, about 175 µm, about 200 µm, about 225 µm, about 250 µm, about 275 µm, about 300 µm, about 325 µm, about 350 µm, about 375 µm, about 400 µm, about 425 µm, about 450 µm, about 475 µm, or about 500 µm, including all ranges and values therebetween. In some embodiments, the powders have a particle size ranging from about 15 to about 75 µm. In some embodiments, powders with a particle size ranging from about 15 to about 75 µm are useful in an additive manufacturing process. In some embodiments, the powder comprises particles having an average particle size d50 of less than about 100 µm. In some embodiments, the powder comprises particles having an average particle size d50 of from about 5 to about 100 µm, e.g., about 5 µm, about 10 µm, about 15 µm, about 20 µm, about 25 m, about 30 µm, about 35 µm, about 40 µm, about 45 µm, about 50 µm, about 55 µm, about 60 µm, about 65 µm, about 70 µm, about 75 µm, about 80 µm, about 85 µm, about 90 µm, about 95 µm, or about 100 µm, including all ranges and values therebetween. In some embodiments, the powder comprises particles having an average particle size d50 of from about 10 to about 70 µm. In some embodiments, the powdered aluminum alloys of the present disclosure are further processed according to any suitable method known in the art to provide a wire, chips, a ribbon, or the like.

In some embodiments, the aluminum alloys of the present disclosure are fabricated into a component, the component having a yield strength greater than 580 MPa, an ultimate tensile strength greater 600 MPa, and an elongation at failure of more than 2%. In some embodiments, the yield strength of the component is from about 500 MPa to about 750 MPa, e.g., about 500 MPa, about 550 MPa, about 600 MPa, about 650 MPa, about 700 MPa, or about 750 MPa, including all ranges and values therebetween. In some embodiments, the ultimate tensile strength of the component is from about 500

MPa to about 750 MPa, e.g., about 500 MPa, about 550 MPa, about 600 MPa, about 650 MPa, about 700 MPa, or about 750 MPa, including all ranges and values therebetween. In some embodiments, the component has an elongation at failure of more than 1%, more than 2%, more than 3%, more than 4%, more than 5%, more than 6%, more than 7%, more than 8%, more than 9%, or more than 10%, including all ranges and values therebetween.

In some embodiments, the aluminum alloys of the present disclosure are formed into a sheet, forging, or extrusion. In some embodiments, the sheet, forging, or extrusion is welded to assemble a component.

In some embodiments, the aluminum alloys of the present disclosure are formed into a rod or wire. In some embodiments, the rod or wire is used a filler material during a melding process to join conventional aluminum alloys, or to join components which have been fabricated from the disclosed alloys. In some embodiments, the composition of the filler material is the same as the aluminum alloy components being joined.

The aluminum alloys of the present disclosure have numerous advantages over convention 7000-series aluminum alloys. In some embodiments, the aluminum alloys of the present disclosure have enhanced thermal stability, e.g., thermal stability greater than that of a convention 7000-series aluminum alloy. In some embodiments, the aluminum alloys of the present disclosure are high-strength, weldable aluminum alloys. In some embodiments, the alloys of the present disclosure possess a strength to weight ratio at room temperature which is at least as great as that of a conventional 7000-series aluminum alloy. In some embodiments, the strength to weight ratio is about 190 MPa·cm$^3$/g to about 370 MPa·cm$^3$/g, e.g., about 190 MPa·cm$^3$/g, about 200 MPa·cm$^3$/g, about 210 MPa·cm$^3$/g, about 220 MPa·cm$^3$/g, about 230 MPa·cm$^3$/g, about 240 MPa·cm$^3$/g, about 250 MPa·cm$^3$/g, about 260 MPa·cm$^3$/g, about 270 MPa·cm$^3$/g, about 280 MPa·cm$^3$/g, about 290 MPa·cm$^3$/g, about 300 MPa·cm$^3$/g, about 310 MPa·cm$^3$/g, about 320 MPa·cm$^3$/g, about 330 MPa·cm$^3$/g, about 340 MPa·cm$^3$/g, about 350 MPa·cm$^3$/g, about 360 MPa·cm$^3$/g, or about 370 MPa·cm$^3$/g, including all ranges and values therebetween as measured by the ASTM-E8/E8M test for strength and a method of determining density (e.g. ASTM B962). In some embodiments, the aforementioned properties result in the disclosed aluminum alloy being weldable or suitable for use in additive manufacturing.

In some embodiments of the present disclosure, the average grain size after a solutionizing heat treatment is less than 100 μm. In some embodiments, the average grain size after a solutionizing heat treatment is less than 95 μm. In some embodiments, the average grain size after a solutionizing heat treatment is less than 90 μm. In some embodiments, the average grain size after a solutionizing heat treatment is less than 85 μm. In some embodiments, the average grain size after a solutionizing heat treatment is less than 80 μm. In some embodiments, the average grain size after a solutionizing heat treatment is less than 75 μm. In some embodiments, the average grain size after a solutionizing heat treatment is less than 70 μm. In some embodiments, the average grain size after a solutionizing heat treatment is less than 65 μm. In some embodiments, the average grain size after a solutionizing heat treatment is less than 60 μm. In some embodiments, the average grain size after a solutionizing heat treatment is less than 55 μm. In some embodiments, the average grain size after a solutionizing heat treatment is less than 50 μm. In some embodiments, the average grain size after a solutionizing heat treatment is less than 45 μm. In some embodiments, the average grain size after a solutionizing heat treatment is less than 40 μm. In some embodiments of the present disclosure, the average grain size after a solutionizing heat treatment is from about 40 to about 100 μm, e.g., about 40 μm, about 45 μm, about 50 μm, about 55 μm, about 60 μm, about 65 μm, about 70 μm, about 75 μm, about 80 μm, about 85 μm, about 90 μm, about 95 μm, or about 100 μm, including all ranges and values therebetween. In some embodiments, refining grain size in this manner results in the disclosed aluminum alloy being free of liquation cracking and hot tearing during a welding or additive manufacturing process.

In some embodiments, the aluminum alloy of the present disclosure or component fabricated from an aluminum alloy of the present disclosure has a tensile strength at least as great as that of a conventional 7000-series aluminum alloy. In some embodiments, the tensile strength of the disclosed aluminum alloy ranges from about 50 to about 750 MPa, e.g., about 50 MPa, about 100 MPa, about 150 MPa, about 200 MPa, about 250 MPa, about 300 MPa, about 350 MPa, about 400 MPa, about 450 MPa, about 500 MPa, about 550 MPa, about 600 MPa, about 650 MPa, about 700 MPa, or about 750 MPa, including all ranges and values therebetween. In some embodiments, the tensile strength is greater than about 350 MPa. In some embodiments, the tensile strength is greater than about 450 MPa. In some embodiments, the tensile strength is greater than about 500 MPa. In some embodiments, the tensile strength is greater than about 550 MPa. In some embodiments, the tensile strength is greater than about 600 MPa. In some embodiments, the tensile strength is greater than about 650 MPa. In some embodiments, the tensile strength is greater than about 700 MPa. In some embodiments, the tensile strength is greater than about 750 MPa.

In some embodiments, the aluminum alloy of the present disclosure or component fabricated from an aluminum alloy of the present disclosure has a shear strength at least as great as that of a conventional 7000-series aluminum alloy. In some embodiments, the shear strength of the disclosed aluminum alloy ranges from about 50 to about 400 MPa, e.g., about 50 MPa, about 75 MPa, about 100 MPa, about 125 MPa, about 150 MPa, about 175 MPa, about 200 MPa, about 225 MPa, about 250 MPa, about 275 MPa, about 300 MPa, about 325 MPa, about 350 MPa, about 375 MPa, or about 400 MPa, including all ranges and values therebetween. In some embodiments, the shear strength is about 250 MPa. In some embodiments, the shear strength is about 300 MPa. In some embodiments, the shear strength is greater that about 200 MPa.

In some embodiments, the aluminum alloy of the present disclosure or component fabricated from an aluminum alloy of the present disclosure has a yield strength at least as great as that of a conventional 7000-series aluminum alloy. In some embodiments, the yield strength of the disclosed aluminum alloy ranges from about 150 to about 600 MPa, e.g., about 150 MPa, about 175 MPa, about 200 MPa, about 225 MPa, about 250 MPa, about 275 MPa, about 300 MPa, about 325 MPa, about 350 MPa, about 375 MPa, about 400 MPa, about 425 MPa, about 450 MPa, about 475 MPa, about 500 MPa, about 525 MPa, about 550 MPa, about 575 MPa, or about 600 MPa, including all ranges and values therebetween. In some embodiments, the yield strength is greater than about 450 MPa. In some embodiments, the yield strength is greater than about 500 MPa. In some embodiments, the yield strength is greater than about 550 MPa. In some embodiments, the yield strength is greater than about 580 MPa.

In some embodiments, the aluminum alloy of the present disclosure or component fabricated from an aluminum alloy of the present disclosure has a modulus of elasticity at least as great as that of a conventional 7000-series aluminum alloy. In some embodiments, the modulus of elasticity of the disclosed aluminum alloy ranges from about 50 to about 80 GPa, e.g., about 50 GPa, about 52.5 GPa, about 55 GPa, about 57.5 GPa, about 60 GPa, about 62.5 GPa, about 65 GPa, about 67.5 GPa, about 70 GPa, about 72.5 GPa, about 75 GPa, about 77.5 GPa, or about 80 GPa, including all ranges and values therebetween. In some embodiments, the modulus of elasticity is about 65 GPa. In some embodiments, the modulus of elasticity is about 70 GPa. In some embodiments, the modulus of elasticity is about 75 GPa. In some embodiments, the modulus of elasticity is about 80 GPa. In some embodiments, the modulus of elasticity is greater that about 75 GPa.

In some embodiments, the aluminum alloy of the present disclosure or component fabricated from an aluminum alloy of the present disclosure has an elongation at failure of from about 1 to about 15%. In some embodiments, the aluminum alloy of the present disclosure or component fabricated from an aluminum alloy of the present disclosure has an elongation at failure of from about 2 to about 10%. In the elongation at failure is more than about 2%, more than about 3%, more than about 4%, more than about 5%, more than about 6%, more than about 7%, more than about 8%, more than about 9%, or more than about 10%. In some embodiments, the elongation at failure is more than about 2%. In some embodiments, the elongation at failure is more than about 3%. In some embodiments, the elongation at failure is more than about 4%. In some embodiments, the elongation at failure is more than about 5%.

In some embodiments, an aluminum alloy component (e.g., a net-shape or a near-net-shape) component fabricated from a 7000-series aluminum alloy of the present disclosure (e.g., by a process such as additive manufacturing or powder metallurgy) possesses a tensile strength, shear strength, yield strength, and/or a modulus of elasticity as defined above.

In some embodiments, based on the foregoing properties, the structure fabricated from the alloy, in any of its forms, may be used in an application where very high strength and low density is desired, such as in an aerospace component, a satellite component, an automotive component, in a transportation application, in a sporting good or leisure equipment, or in a consumer product.

As noted above, in some embodiments, the aluminum alloys of the present disclosure are in the form of powders. In some embodiments, the aluminum alloy powders disclosed herein are useful in additive manufacturing processes. In some embodiments, the aluminum alloy powders that are useful in additive manufacturing processes are spherical metal alloy powders. In some embodiments, the spherical metal powders are formed using gas-atomization, plasma-atomization, or plasma-spherization.

In some embodiments, the aluminum alloys disclosed herein are useful in joining techniques, including, but not limited to welding. Without being bound by any particular theory, the utility of the disclosed aluminum alloys may be a result of their reduced or eliminated tendency to undergo hot-cracking or liquation-cracking when subjected to the above processes.

Methods

In some embodiments, a method of producing a weldable 7000-series aluminum alloy is provided, the method comprising: a) melting recycled or virgin aluminum, while adding aluminum-master alloys or pure elements, at a temperature of about 700° C. to about 1000° C. to form a liquid mixture of constituents, the liquid mixture of constituents comprising about 4 to about 12% by weight zinc, about 1 to about 4% by weight magnesium, about 0.3 to about 2% by weight of a transition metal or a rare earth metal, and aluminum as the remainder, and wherein the constituents do not comprise any intentionally added scandium; b) casting the melted constituents into an ambient or a chilled casting mold to form a casted ingot; c) heat-treating the casted ingot at a temperature of about 400° C. to about 480° C. for a time of about 0.25 hours to about 6 hours to form a solutionized ingot comprising an Al—Zn—Mg solid-solution with a dispersion of $L1_2$ structured $Al_3Zr$ nano-scale precipitates; and d) hot-forming and/or cold-forming the solutionized ingot into a sheet, a foil, a rod, a wire, an extrusion, or a forging.

In some embodiments, a method of producing a weldable 7000-series aluminum alloy is provided, the method comprising: a) melting recycled or virgin aluminum, while adding aluminum-master alloys or pure elements, at a temperature of about 700° C. to about 1000° C. to form a liquid mixture of constituents, the liquid mixture of constituents comprising about 4 to about 12% by weight zinc, about 1 to about 4% by weight magnesium, about 0.3 to about 2% by weight of a transition metal, and aluminum as the remainder, and wherein the constituents do not comprise any intentionally added scandium; b) casting the melted constituents into an ambient or a chilled casting mold to form a casted ingot; c) heat-treating the casted ingot at a temperature of about 400° C. to about 480° C. for a time of about 0.25 hours to about 6 hours to form a solutionized ingot comprising an Al—Zn—Mg solid-solution with a dispersion of $L1_2$ structured $Al_3Zr$ nano-scale precipitates; and d) hot-forming and/or cold-forming the solutionized ingot into a sheet, a foil, a rod, a wire, an extrusion, or a forging.

In some embodiments, the transition metal in the liquid mixture of constituents is selected from the group consisting of titanium, hafnium, vanadium, niobium, tantalum, chromium, molybdenum, tungsten, and yttrium. In some embodiments, the transition metal in the liquid mixture of constituents in zirconium.

In some embodiments, the rare earth metal is selected from the group consisting of lanthanum, cerium, praseodymium, neodymium, gadolinium, dysprosium, erbium, ytterbium, or combinations thereof.

In some embodiments, the amount of zinc in the liquid mixture of constituents is from about 4 to about 12% by weight zinc, e.g., about 4%, about 4.5%, about 5%, about 5.5%, about 6%, about 6.5%, about 7%, about 7.5%, about 8%, about 8.5%, about 9%, about 9.5%, about 10%, about 10.5%, about 11%, about 11.5%, or about 12%, including all ranges and values therebetween. In some embodiments, the alloys of the present disclosure comprise about 5 to about 12% by weight zinc, about 6 to about 12% by weight zinc, about 7 to about 12%, about 8 to about 12%, about 9 to about 12%, about 10 to about 12%, about 5 to about 11%, about 6 to about 11%, about 7 to about 11%, about 8 to about 11%, about 4 to about 10%, about 5 to about 10%, about 6 to about 10%, about 7 to about 10%, about 8 to about 10%, about 4 to about 9%, about 5 to about 9%, about 6 to about 9%, about 7 to about 9%, about 4 to about 8%, about 5 to about 8%, about 6 to about 8%, about 4 to about 7%, about 5 to about 7%, about 4 to about 6%, including all ranges and values therebetween. In some embodiments, the amount of zinc in the liquid mixture of constituents is about 10% by weight zinc. In some embodiments, the amount of zinc in the liquid mixture of constituents is about 11% by weight zinc.

In some embodiments, the amount of zinc in the liquid mixture of constituents is about 12% by weight zinc.

In some embodiments, the amount of magnesium in the liquid mixture of constituents is from about 1 to about 4% by weight magnesium, e.g., about 1%, about 1.25%, about 1.5%, about 1.75%, about 2%, about 2.25%, about 2.5%, about 2.75%, about 3%, about 3.25%, about 3.5%, about 3.75%, or about 4%, including all ranges and values therebetween. In some embodiments, the amount of magnesium in the liquid mixture of constituents is about 1.5% by weight magnesium. In some embodiments, the amount of magnesium in the liquid mixture of constituents is about 2% by weight magnesium. In some embodiments, the amount of magnesium in the liquid mixture of constituents is about 2.5% by weight magnesium. In some embodiments, the amount of magnesium in the liquid mixture of constituents is about 3% by weight magnesium.

In some embodiments, the temperature of step a) is about 700° C., about 725° C., about 750° C., about 775° C., about 800° C., about 825° C., about 850° C., about 875° C., 900° C., about 925° C., about 950° C., about 975° C., or about 1000° C., including all ranges and values therebetween. In some embodiments, the temperature of step a) is from about 750° C. to about 1000° C. In some embodiments, the temperature of step a) is from about 800° C. to about 1000° C. In some embodiments, the temperature of step a) is from about 850° C. to about 1000° C. In some embodiments, the temperature of step a) is from about 900° C. to about 1000° C.

In some embodiments, step a) includes the constituents zinc (Zn), magnesium (Mg), and zirconium (Zr) in any amount or range described above for the aluminum alloys of the present disclosure.

In some embodiments, the constituents of step a) further comprise about 0.0 to about 4% by weight copper, e.g., about 0%, about 0.25%, about 0.50%, about 0.75%, about 1%, about 1.25%, about 1.50%, about 1.75%, about 2%, about 2.25%, about 2.50%, about 2.75%, about 3%, about 3.25%, about 3.50%, about 3.75%, or about 4% by weight copper, including all ranges and values therebetween. In some embodiments, the amount of copper is less than about 4% by weight copper, less than about 3% by weight copper, less than about 2% by weight copper, or less than about 1% by weight copper. In some embodiments, the amount of copper is up to about 3% by weight. In some embodiments, when copper is present, the solutionized ingot comprises an Al—Zn—Mg—Cu solid-solution with the dispersion of $L1_2$ structured $Al_3Zr$ nano-scale precipitates.

As noted, the constituents of the liquid mixture of step a) comprise no intentionally added scandium. Accordingly, in some embodiments, the liquid mixture of constituents in step a) comprises less than about 0.5% scandium, less than about 0.5% scandium, less than about 0.3% scandium, less than about 0.2% scandium, less than about 0.1% scandium, or less than about 0.05% scandium, none of which has been intentionally added to the aluminum alloys of the present disclosure.

In some embodiments, step b) of the method of producing a weldable 7000-series aluminum alloy includes casting the melted constituents into an ambient casting mold to form a casted ingot. In some embodiments, step b) of the method of producing a weldable 7000-series aluminum alloy includes casting the melted constituents into a chilled casting mold to form a casted ingot. In some embodiments, the chilled coasting mold is at a temperature below about 20° C., below about 15° C., below about 10° C., below about 5° C., or below about 0° C. In some embodiments, the chilled casting mold is from about 0° C. to about 15° C., e.g., about 0° C., about 3° C., about 6° C., about 9° C., about 12° C., or about 15° C., including all ranges and values therebetween. In some embodiments, the chilled casting mold is from about 5° C. to about 10° C. In some embodiments, the chilled casting mold is from about 0° C. to about 10° C.

In some embodiments, the heat-treating the casted ingot of step c) occurs at a temperature of about 400° C., about 410° C., about 420° C., about 430° C., about 440° C., about 450° C., about 460° C., about 470° C., or about ° C., including all ranges and values therebetween. In some embodiments, the heat-treating the casted ingot of step c) occurs for a time of about 0.25 h, about 0.5 h, about 0.75 h, about 1 h, about 1.25 h, about 1.5 h, about 1.75 h, about 2 h, about 2.25 h, about 2.5 h, about 2.75 h, about 3 h, about 3.25 h, about 3.5 h, about 3.75 h, about 4 h, about 4.25 h, about 4.5 h, about 4.75 h, about 5 h, about 5.25 h, about 5.5 h, about 5.75 h, or about 6 hours, including all ranges and values therebetween, to form a solutionized ingot comprising an Al—Zn—Mg solid-solution with a dispersion of $L1_2$ structured A3Zr nano-scale precipitates.

In some embodiments, the hot-forming and/or cold-forming of the solutionized ingot of step d) provides a sheet. In some embodiments, the hot-forming and/or cold-forming of the solutionized ingot of step d) provides a foil. In some embodiments, the hot-forming and/or cold-forming of the solutionized ingot of step d) provides a rod. In some embodiments, the hot-forming and/or cold-forming of the solutionized ingot of step d) provides a wire. In some embodiments, the hot-forming and/or cold-forming of the solutionized ingot of step d) provides an extrusion. In some embodiments, the hot-forming and/or cold-forming of the solutionized ingot of step d) provides a forging.

In some embodiments, the method of producing a weldable 7000-series aluminum alloy further comprises step e) heat-aging the formed sheet, foil, rod, wire, extrusion, or forging at a temperature of about 100° C. to about 180° C. for a time of about 1 hour to about 48 hours.

In some embodiments, the heat-aging of step e) is carried out at about 100° C., about 105° C., about 100° C., about 105° C., about 100° C., about 105° C., about 100° C., about 105° C., about 100° C., about 105° C., about 100° C., about 105° C., about 100° C., about 105° C., about 100° C., about 105° C., or about 180° C., including all ranges and values therebetween.

In some embodiments, the heat-aging of step e) is for a time of about 1 h, about 2 h, about 3 h, about 4 h, about 5 h, about 6 h, about 7 h, about 8 h, about 9 h, about 10 h, about 11 h, about 12 h, about 13 h, about 14 h, about 15 h, about 16 h, about 17 h, about 18 h, about 19 h, about 20 h, about 21 h, about 22 h, about 23 h, about 24 h, about 25 h, about 26 h, about 27 h, about 28 h, about 29 h, about 30 h, about 31 h, about 32 h, about 33 h, about 34 h, about 35 h, about 36 h, about 37 h, about 38 h, about 39 h, about 40 h, about 41 h, about 42 h, about 43 h, about 44 h, about 45 h, about 46 h, about 47 h, or about 48 h, including all ranges and values therebetween. In some embodiments, the heat-aging of step e) is for a time of about 1 h to about 10 h. In some embodiments, the heat-aging of step e) is for a time of about 1 h to about 5 h. In some embodiments, the heat-aging of step e) is for a time of about 1 h to about 3 h. In some embodiments, the heat-aging of step e) is for a time of about 5 h to about 20 h. In some embodiments, the heat-aging of step e) is for a time of about 5 h to about 15 h. In some embodiments, the heat-aging of step e) is for a time of about 5 h to about 10 h.

In some embodiments, the aluminum alloys disclosed herein are produced by a rapid solidification process, as described in E. J. Lavernia et al. *Journal of Material Science* 2010, 45, 287-325, the disclosure of which is hereby incorporated by reference in its entirety. In some embodiments, the rapid solidification process is selected from the group consisting of melt spinning, melt extraction, beam glazing, spray deposition, gas atomization, plasma atomization, and plasma spherization. In some embodiments, the rapid solidification process is defined by a cooling rate of from about $10^2$ to about 107 $Ks^{-1}$, e.g., about $10^2$ $Ks^{-1}$, about $10^3$ $Ks^{-1}$, about $10^4$ $Ks^{-1}$, about $10^5$ $Ks^{-1}$, about $10^6$ $Ks^{-1}$, or about $10^7$ $Ks^{-1}$, including all ranges and values therebetween.

Melt spinning is a convenient and economic method for fabricating metallic ribbons at industrial scales. In some applications of melt spinning, the substance (e.g., an aluminum alloy) is melted for extrusion through a spinneret and then directly solidified by cooling. In some embodiments, melt spinning further produces non-equilibrium phases such as nanocrystalline phases, quasi-crystalline phases, and a supersaturated solid solutions. In some embodiments, the aluminum alloys produced from melt spinning are in the form of ribbons (i.e., thin strips. In some embodiments, melt spinning produces ribbons comprising amorphous aluminum alloys and/or glassy aluminum alloys.

Spray deposition, also known as spray casting, spray forming and in-situ compaction, is a method of casting near net shape metal components with homogeneous microstructures via the deposition of semi-solid sprayed droplets onto a shaped substrate. In some embodiments, the spay deposition method is selected from the group consisting of cold gas spraying, plasma spraying (vacuum, atmospheric, and the like), high-velocity oxy-fuel spraying (HVOF), gas-assisted spray forming, or combustion flame spraying. In some embodiments, spray deposition involves the atomization of molten metal, but instead of being allowed to solidify as powder, the spray is collected on a substrate to form billets for subsequent forging. In some embodiments, spray deposition is used to form tubes, strips, sheets, or near-net shape pre-forms of 7000-series aluminum alloys.

In plasma spherization, non-spherical powders are melted in a plasma beam to form spherical particles. In some embodiments, a gas (e.g., $N_2$, Ar) is used to transport the powder. In some embodiments, this method is useful in producing aluminum alloys of the present disclosure having high melting points. In some embodiments, plasma spherization is used to transform irregular shaped 7000-series aluminum alloy particles into spherical powders of a 7000-series aluminum alloy. In some embodiments, the spherical powders thus produced have a uniform composition.

Plasma atomization is also useful for preparing spherical powders of 7000-series aluminum alloys. In some embodiments, plasma atomization is used to transform feedstock 7000-series aluminum alloy into spherical powders of a 7000-series aluminum alloy. In some embodiments, the spherical powders thus produced have a uniform composition. In some embodiments, 7000-series aluminum alloy wire feedstock is fed into a plasma torch that, with the aid of gases, atomises the wire into a spherical metal powder. In some embodiments, the size of the powder particles ranges from about 1 to about 200 µm, including all ranges and values therebetween.

Another method of metal powder production is gas atomization. In some embodiments, the aluminum alloy feedstock is melted under an air or inert gas blanket, or under vacuum. The chamber can then be backfilled with gas to force molten alloy through a nozzle where high velocity air, nitrogen, helium, or argon gas impinges onto the flowing melt and breaks it up. The resulting powder is mostly spherical. In some embodiments, small amounts of asymmetric particles and satellites (i.e., small particle adhering to a larger one) are present.

In some embodiments, the rapid solidification process results in the formation of primary crystallites that are about 10 µm or less in diameter. In some embodiments, the primary crystallites are less than about 10 µm, less than about 9 µm, less than about 8 µm, less than about 7 µm, less than about 6 µm, less than about 5 µm, less than about 4 µm, less than about 3 µm, less than about 2 µm, or less than about 1 µm, including all ranges and values therebetween. In some embodiments the rapid solidification process results in extended ranges of solid solutions.

Generally, because of the rapid solidification of the metal alloy during the atomizing process, the powders may consist primarily of a solid solution of the alloying elements but may also contain intermetallic phases (e.g., $Al_3Zr$). If the metal alloy powders are synthesized by a mechanically alloying process, which is a solid-state process that does not include quenching a molten alloy into a solid, the mechanical energy input is enough so that the metal alloy powders will still consist primarily of a solid solution of the alloying elements but may also contain secondary intermetallic phases. The presence of secondary intermetallic phases is considered neither a detrimental nor beneficial attribute of the metal alloy powders if they are to be used in an additive manufacturing process which forms a liquid phase in the alloy; such intermetallic phases may be considered beneficial for the metal alloy powders if they are to be used in a powder metallurgy process which does not form a liquid phase, and the method of fabricating a powder may be adjusted in such a way as to promote the formation of secondary intermetallic phases in the metal alloy powder.

The method disclosed herein may include fabricating a component using a manufacturing technique that utilizes welding where the disclosed alloy is utilized as the base material or as a filler material. In some embodiments, the 7000-series aluminum alloy rods and wires described above are used as filler material to join two aluminum alloy components in a welding process. Accordingly, a method of preparing a welded metallic assembly is provided, the method comprising joining two aluminum alloy components with a filler material in a welding process, wherein the filler material joining the components is the wire or the rod fabricated from a 7000-series aluminum alloy of the present disclosure, and wherein the two aluminum alloy components are each independently selected from the group consisting of Al—Zn—Mg alloys, Al—Zn—Mg—Cu alloys, Al—Zn—Mg—Zr alloys, and Al—Zn—Mg—Cu—Zr alloys. In some embodiments, the filler material is a rod fabricated from a 7000-series aluminum alloy of the present disclosure. In some embodiments, the filler material is a wire fabricated from a 7000-series aluminum alloy of the present disclosure. In some embodiments, the filler material is a sheet fabricated from a 7000-series aluminum alloy of the present disclosure.

In some embodiments, the welding process is selected from the group consisting of arc-welding, torch-welding, laser-beam-welding, and electron-beam-welding. In some embodiments, the welding process does not result in liquation cracking and/or hot tearing of the welded metallic assembly. Thus, in some embodiments, the welded metallic assembly is free of liquation cracks and hot cracks.

In some embodiments, the filler material and the two aluminum alloy components have the same composition. Accordingly, in some embodiments, the filler material and the two aluminum alloy components each independently selected from the group consisting of Al—Zn—Mg alloys, Al—Zn—Mg—Cu alloys, Al—Zn—Mg—Zr alloys, and Al—Zn—Mg—Cu—Zr alloys comprise about 4 to about 12% by weight zinc, about 1 to about 4% by weight magnesium, about 0.3 to about 2% zirconium when present, and up to about 3% copper when present. As noted above, neither the filler material, nor the aluminum alloy components have any intentionally added scandium.

Figure 7:
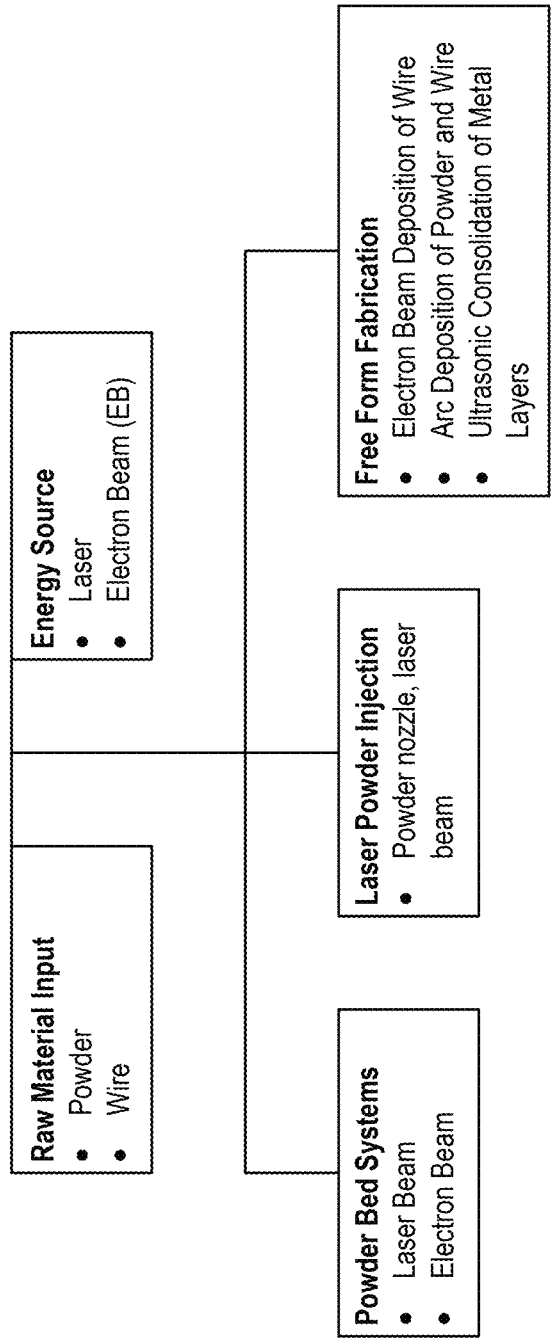
FIG. 7 shows non-limiting examples of additive manufacturing (AM) processes, according to an embodiment.

The 7000-series aluminum alloys disclosed herein are suitable for use in various additive manufacturing processes due to their beneficial properties including, but not limited to weldability and high strength to weight ratios. Examples of additive manufacturing processes are disclosed in U.S. Pat. No. 10,124,408, which is incorporated herein by reference in its entirety. FIG. 7 provides a non-limiting overview of some additive manufacturing processes applicable to aluminum alloys.

In some embodiments, the present disclosure provides a method of manufacturing a net-shape component or a near-net-shape component, the method comprising subjecting an aluminum alloy of the present disclosure to an additive manufacturing process (e.g., an additive layering manufacturing process) to manufacture the net-shape component or the near-net-shape component. In some embodiments, the aluminum alloy is a rod, a wire, a ribbon, a powder, or chips. In some embodiments, the aluminum alloy is a wire. In some embodiments, the aluminum alloy is a powder. In some embodiments, the powder is a spherical aluminum alloy powder. The method may include using a pre-alloyed metal powders to fabricate a structure using an additive manufacturing (or powder metallurgy) process, where the method may include the formation of a liquid phase.

In some embodiments, the additive manufacturing process is powder bed fusion or selective laser melting. In some embodiments, the additive manufacturing process is powder bed fusion. In some embodiments, the additive manufacturing process is selective laser melting. In some embodiments of a powder bed fusion or selective laser melting process, a laser is used to melt the powders and fuse them together into a net-shape, or near-net-shape component.

In some embodiments, the additive manufacturing process is powder directed energy deposition. In some embodiments of a powder directed energy deposition process, a laser is used to melt blown powders and fuse them onto a net-shape, or near-net-shape component.

In some embodiments, the additive manufacturing process includes subjecting the aluminum alloy to a focused energy source. In some embodiments, the focused energy source is selected from the group consisting of a laser beam and an electron beam. In some embodiments, the focused energy source is a laser beam. In some embodiments, the laser beam is a pulsed energy laser beam. In some embodiments, the focused energy source is an electron beam.

In some embodiments of the additive manufacturing process, the focused energy source is used to fully melt the aluminum alloy. In some embodiments, the fully melted aluminum alloy is deposited as a layer to a preexisting substrate or a previously deposited layer of the aluminum alloy. In some embodiments, deposited layer of the aluminum alloy undergoes rapid solidification to fuse the material to the preexisting substrate or the previously deposited layer of the aluminum alloy. In some embodiments, the rapid solidification occurs at a cooling rate of about $10^2$ to about $10^8$ $Ks^{-1}$, e.g., about $10^2$ $Ks^{-1}$, about $10^3$ $Ks^{-1}$, about $10^4$ $Ks^{-1}$, about $10^5$ $Ks^{-1}$, about $10^6$ $Ks^{-1}$, about $10^7$ $Ks^{-1}$, or about $10^8$ $Ks^{-1}$, including all ranges and values therebetween. In some embodiments, the rapid solidification occurs at a cooling rate of at least about $10^7$ $Ks^{-1}$. In some embodiments, the rapid solidification occurs at a cooling rate greater than about $10^7$ $Ks^{-1}$. As described herein, the net-shape components or near-net shape components prepared using the 7000-series aluminum alloys of the present disclosure avoid liquation cracking and hot cracking as a result of the beneficial properties of the disclosed aluminum alloy materials.

In some embodiments, the additive manufacturing process disclosed herein further comprises heat-aging the net-shape or near-net-shape component at a temperature of about 100° C. to about 180° C. for a time of about 1 hour to about 48 hours, to achieve a simultaneous dispersion of fine-scale $Zn_2Mg$ precipitates, primary precipitates, and Al—X nano-scale precipitates, and resulting in the component having a strength which is at least as great as that of a net-shape or near-net-shape component conventionally manufactured from a conventional 7000-series aluminum alloy. In some embodiments, the primary precipitates have an average diameter ranging from about 0.1 to about 10 μm, e.g., about 0.1 μm, about 0.5 μm, about 1 μm, about 1.5 μm, about 2 μm, about 2.5 μm, about 3 μm, about 3.5 μm, about 4 μm, about 4.5 μm, about 5 μm, about 5.5 μm, about 6 μm, about 6.5 μm, about 7 μm, about 7.5 μm, about 8 μm, about 8.5 μm, about 9 μm, about 9.5 μm, or about 10 μm, including all ranges and values therebetween. In some embodiments, the primary precipitates have an average diameter ranging from about 0.5 to about 1.5 μm. In some embodiments, the primary precipitates have an average diameter ranging from about 0.1 to about 1.5 μm. In some embodiments, the primary precipitates are Al—X primary precipitates. In some embodiments, X is Ti, Zr, Hf, V, Nb, Ta, Cr, Mo, W, Mn, Y, La, Ce, Pr, Nd, Pm, Sm, Gd, Tb, Dy, Ho, Er, Tm, Yb, or Lu. In some embodiments, X is Zr. In some embodiments, the primary precipitates are A3Zr primary precipitates. In some embodiments, the Al—X nano-scale precipitates have an average diameter ranging from about 1 to about 100 nm, e.g., about 1 nm, about 2 nm, about 4 nm, about 6 nm, about 8 nm, about 10 nm, about 12 nm, about 14 nm, about 16 nm, about 18 nm, about 20 nm, about 22 nm, about 24 nm, about 26 nm, about 28 nm, about 30 nm, about 32 nm, about 34 nm, about 36 nm, about 38 nm, about 40 nm, about 42 nm, about 44 rim, about 46 nm, about 48 nm, about 50 nm, about 52 rim, about 54 nm, about 56 nm, about 58 nm, about 60 nm, about 62 nm, about 64 nm, about 66 nm, about 68 nm, about 70 nm, about 72 nm, about 74 nm, about 76 nm, about 78 nm, about 80 nm, about 82 nm, about 84 nm, about 86 nm, about 88 nm, about 90 nm, about 92 nm, about 94 nm, about 96 nm, about 98 nm, or about 100 nm, including all ranges and values therebetween. In some embodiments, the Al—X nano-scale precipitates have an average diameter ranging from about 3 to about 50 nm. In some embodiments, the $Al_3Zr$ nano-scale precipitates have an average diameter ranging from about 3 to about 20 nm. In some embodiments, the Al—X nano-scale precipitates have an average diameter ranging from about 3 to about 10 nm. In some embodiments, X is Ti, Zr, Hf, V, Nb, Ta, Cr, Mo, W, Mn, Y, La, Ce, Pr, Nd, Pm, Sm, Gd, Tb, Dy, Ho, Er, Tm, Yb, or Lu. In some embodiments, the nano-scale precipitates are $Al_3Zr$ nano-scale precipitates.

In some embodiments, heat-aging the net-shape component or near-net-shape component is carried out at a temperature of about 100° C., about 110° C., about 120° C., about 130° C., about 140° C., about 150° C., about 160° C., about 170° C., or about 180° C., including all ranges and values therebetween.

In some embodiments, the heat-aging the net-shape component or near-net-shape component is for a time of about 1 h, about 2 h, about 3 h, about 4 h, about 5 h, about 6 h, about 7 h, about 8 h, about 9 h, about 10 h, about 11 h, about 12 h, about 13 h, about 14 h, about 15 h, about 16 h, about 17 h, about 18 h, about 19 h, about 20 h, about 21 h, about 22 h, about 23 h, about 24 h, about 25 h, about 26 h, about 27 h, about 28 h, about 29 h, about 30 h, about 31 h, about 32 h, about 33 h, about 34 h, about 35 h, about 36 h, about 37 h, about 38 h, about 39 h, about 40 h, about 41 h, about 42 h, about 43 h, about 44 h, about 45 h, about 46 h, about 47 h, or about 48 h, including all ranges and values therebetween. In some embodiments, the heat-aging of step is for a time of about 1 h to about 10 h. In some embodiments, the heat-aging of step is for a time of about 1 h to about 5 h. In some embodiments, the heat-aging of step is for a time of about 1 h to about 3 h. In some embodiments, the heat-aging of step is for a time of about 5 h to about 20 h. In some embodiments, the heat-aging of step is for a time of about 5 h to about 15 h. In some embodiments, the heat-aging of step is for a time of about 5 h to about 10 h.

In some embodiments of the additive manufacturing process, prior to the heat-aging step, the net-shape component or near-net-shape component is heat treated at a temperature of about 400° C. to about 480° C. for a time of about 0.25 hours to about 6 hours. In some embodiments, the temperature for heat-treating is about 400° C., about 410° C., about 420° C., about 430° C., about 440° C., about 450° C., about 460° C., about 470° C., or about 480° C., including all ranges and values therebetween. In some embodiments, heat-aging is for a time of about 0.25 h, about 0.5 h, about 0.75 h, about 1 h, about 1.25 h, about 1.5 h, about 1.75 h, about 2 h, about 2.25 h, about 2.5 h, about 2.75 h, about 3 h, about 3.25 h, about 3.5 h, about 3.75 h, about 4 h, about 4.25 h, about 4.5 h, about 4.75 h, about 5 h, about 5.25 h, about 5.5 h, about 5.75 h, or about 6 hours, including all ranges and values therebetween.

In some embodiments, a method of manufacturing an aluminum alloy component comprises using a wire produced by the methods disclosed herein in an additive manufacturing process to manufacture a net-shape or a near-net-shape component. In some embodiments, the method comprises heat-treating the net shape or near net shape component at a temperature of about 400° C. to about 480° C. for a time of about 0.25 hours to about 6 hours, after the wire using step and before the heat-aging step. In some embodiments, the method further comprises, after the heating treating step, heat-aging the net-shape or near-net-shape component at a temperature of about 100° C. to about 180° C. for a time of about 1 hour to about 48 hours, to achieve a simultaneous dispersion of fine-scale $Zn_2Mg$ precipitates, primary precipitates having an average diameter of about 0.1 to about 10 µm, and Al—X nano-scale precipitates having an average diameter of about 1 to about 100 nm, and resulting in the component having a strength which is at least as great as that of a component conventionally manufactured from a conventional 7000-series aluminum alloy. In some embodiments, X is Ti, Zr, Hf, V, Nb, Ta, Cr, Mo, W, Mn, Y, La, Ce, Pr, Nd, Pm, Sm, Gd, Tb, Dy, Ho, Er, Tm, Yb, or Lu. In some embodiments, X is Zr.

The present disclosure also provides a method of manufacturing a net-shape component, a near-net-shape component, or a component extruded from a billet, the method comprising subjecting the ribbon, chips, or powder fabricated from a 7000-series aluminum alloy disclosed herein to a powder metallurgy process to manufacture the net-shape component, the near-net-shape component, or the component extruded from a billet. In some embodiments, the powder metallurgy process includes hot pressing, hot isostatic pressing, cold isostatic pressing, powder molding, hot extrusion, or extrusion.

Figure 8:
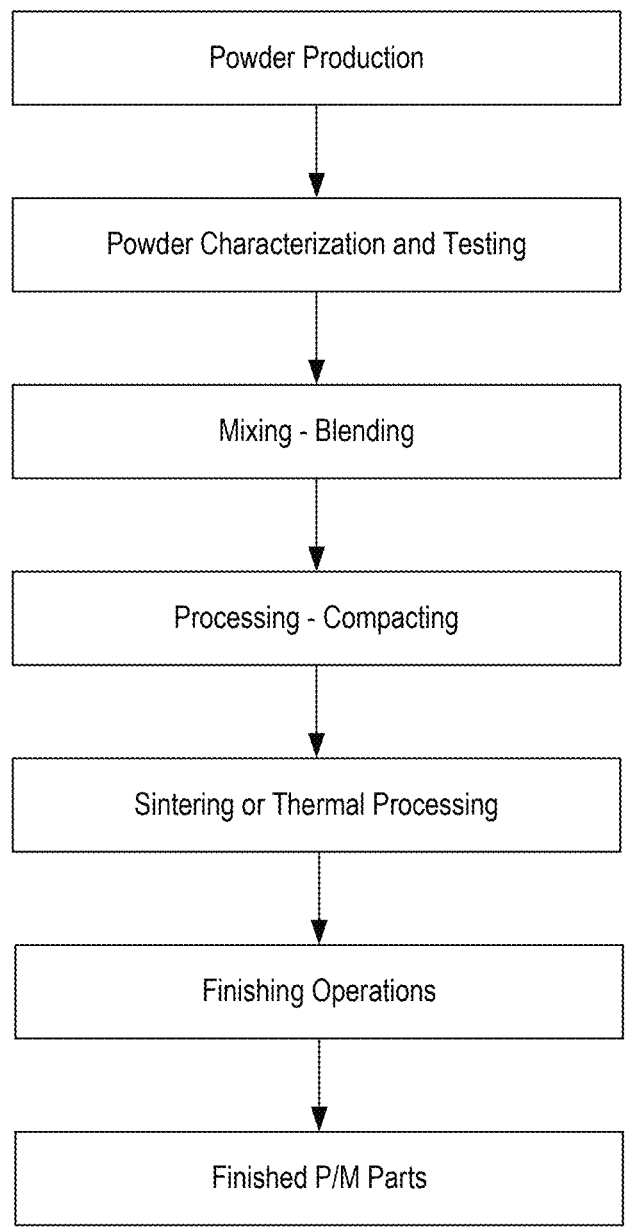
FIG. 8 shows a general powder metallurgy process that includes the steps of compaction and sintering or thermal processing, according to an embodiment.

FIG. 8 provides an overview of some of the steps in a general powder metallurgy process. In some embodiments, powder metallurgy includes blending a powder fabricated from a 7000-series aluminum alloy of the present disclosure to form a homogenous mass with uniform distribution of particle size and composition. In some embodiments, the powder metallurgy process further involves pressing or compacting the powder (e.g., powder particles) fabricated from a 7000-series aluminum alloy of the present disclosure in a die and sintering the powder to fuse (or bond) the particles together. In some embodiments, the pressing is carried out at high pressure. In some embodiments, the sintering carried out at a temperature from about 300° C. to about 650° C., e.g., about 300° C., about 325° C., about 350° C., about 375° C., about 400° C., about 425° C., about 450° C., about 475° C., about 500° C., about 525° C., about 550° C., about 575° C., about 600° C., about 625° C., or about 650° C., including all ranges and values therebetween. In some embodiments, the sintering temperature is below the melting temperature of the major component in the aluminum alloy. In some embodiments, being below the melting means carrying out the sintering process at a temperature that is from about 70-90% of the melting point of the metal. In some embodiments, the sintering is carried out under inert atmosphere conditions, such as argon or nitrogen. After cooling and optional secondary processing, the finished product is obtained.

In some embodiments, the aluminum alloy powder of the present disclosure for use in the powder metallurgy process is prepared by a rapid solidification process. In some embodiments the process results in the formation of a powder comprising a solid solution of the alloying elements (Mg, Zn, Zr, etc.). In some embodiments, the powder further comprises one or more secondary intermetallic phases. In some embodiments, the disclosed powder metallurgy process is modified by any suitable method to promote the formation of intermetallic phases.

In some embodiments, the powder metallurgy process disclosed herein comprises heating treating the net-shape component, the near-net-shape component, or the component extruded from the billet at a temperature of about 400° C. to about 480° C. (e.g., about 400° C., about 410° C., about 420° C., about 430° C., about 440° C., about 450° C., about 460° C., about 470° C., or about 480° C., including all ranges and values therebetween) for a time of about 0.25 hours to about 6 hours (e.g., 0.25 h, about 0.5 h, about 0.75 h, about 1 h, about 1.25 h, about 1.5 h, about 1.75 h, about 2 h, about 2.25 h, about 2.5 h, about 2.75 h, about 3 h, about 3.25 h, about 3.5 h, about 3.75 h, about 4 h, about 4.25 h, about 4.5 h, about 4.75 h, about 5 h, about 5.25 h, about 5.5 h, about 5.75 h, or about 6 hours, including all ranges and values therebetween).

In some embodiments, the powder metallurgy process disclosed herein further comprises heat-aging the net-shape component, the near-net-shape component, or the component extruded from the billet at a temperature of about 100° C. to about 180° C. for a time of about 1 hour to about 48 hours, to achieve a simultaneous dispersion of fine-scale $Zn_2Mg$ precipitates, primary precipitates, and $Al_3Zr$ nano-scale precipitates, and resulting in the component having a strength which is at least as great as that of a net-shape or near-net-shape component conventionally manufactured from a conventional 7000-series aluminum alloy. In some embodiments, the primary precipitates have an average diameter ranging from about 0.1 to about 10 µm, e.g., about 0.1 µm, about 0.5 µm, about 1 µm, about 1.5 µm, about 2 µm, about 2.5 µm, about 3 µm, about 3.5 µm, about 4 µm, about 4.5 µm, about 5 µm, about 5.5 µm, about 6 µm, about 6.5 µm, about 7 µm, about 7.5 µm, about 8 µm, about 8.5 µm, about 9 µm, about 9.5 µm, or about 10 µm, including all ranges and values therebetween. In some embodiments, the primary precipitates have an average diameter ranging from about 0.5 to about 1.5 µm. In some embodiments, the primary precipitates have an average diameter ranging from about 0.1 to about 1.5 µm. In some embodiments, the primary precipitates are Al—X primary precipitates. In some embodiments, X is Ti, Zr, Hf, V, Nb, Ta, Cr, Mo, W, Mn, Y, La, Ce, Pr, Nd, Pm, Sm, Gd, Tb, Dy, Ho, Er, Tm, Yb, or Lu. In some embodiments, X is Zr. In some embodiments, the primary precipitates are $Al_3Zr$ primary precipitates. In some embodiments, the Al—X nano-scale precipitates have an average diameter ranging from about 1 to about 100 nm, e.g., about 1 nim, about 2 nm, about 4 nm, about 6 nim, about 8 nm, about 10 nm, about 12 µm, about 14 nm, about 16 nm, about 18 µm, about 20 nm, about 22 nm, about 24 nm, about 26 nm, about 28 nm, about 30 µm, about 32 µm, about 34 nm, about 36 nm, about 38 nm, about 40 nm, about 42 nm, about 44 µm, about 46 nm, about 48 nm, about 50 nm, about 52 nm, about 54 nm, about 56 nm, about 58 nm, about 60 nm, about 62 nm, about 64 nm, about 66 nm, about 68 nm, about 70 nm, about 72 nm, about 74 nm, about 76 µm, about 78 µm, about 80 nm, about 82 nm, about 84 nm, about 86 nm, about 88 nm, about 90 µm, about 92 nm, about 94 nm, about 96 nm, about 98 nm, or about 100 nm, including all ranges and values therebetween. In some embodiments, the Al—X nano-scale precipitates have an average diameter ranging from about 3 to about 50 nm. In some embodiments, the $Al_3Zr$ nano-scale precipitates have an average diameter ranging from about 3 to about 20 nm. In some embodiments, the Al—X nano-scale precipitates have an average diameter ranging from about 3 to about 10 nm. In some embodiments, X is Ti, Zr, Hf, V, Nb, Ta, Cr, Mo, W, Mn, Y, La, Ce, Pr, Nd, Pm, Sm, Gd, Tb, Dy, Ho, Er, Tm, Yb, or Lu. In some embodiments, the nano-scale precipitates are $Al_3Zr$ nano-scale precipitates.

In some embodiments, the heat-aging the net-shape component, the near-net-shape component, or the component extruded from the billet is for a time of about 1 h, about 2 h, about 3 h, about 4 h, about 5 h, about 6 h, about 7 h, about 8 h, about 9 h, about 10 h, about 11 h, about 12 h, about 13 h, about 14 h, about 15 h, about 16 h, about 17 h, about 18 h, about 19 h, about 20 h, about 21 h, about 22 h, about 23 h, about 24 h, about 25 h, about 26 h, about 27 h, about 28 h, about 29 h, about 30 h, about 31 h, about 32 h, about 33 h, about 34 h, about 35 h, about 36 h, about 37 h, about 38 h, about 39 h, about 40 h, about 41 h, about 42 h, about 43 h, about 44 h, about 45 h, about 46 h, about 47 h, or about 48 h, including all ranges and values therebetween. In some embodiments, the heat-aging of step is for a time of about 1 h to about 10 h. In some embodiments, the heat-aging of step is for a time of about 1 h to about 5 h. In some embodiments, the heat-aging of step is for a time of about 1 h to about 3 h. In some embodiments, the heat-aging of step is for a time of about 5 h to about 20 h. In some embodiments, the heat-aging of step is for a time of about 5 h to about 15 h. In some embodiments, the heat-aging of step is for a time of about 5 h to about 10 h.

In some embodiments, an aluminum alloy component is manufactured by fabricating a ribbon, chips, or a powder from any of the 7000-series aluminum alloys using a rapid solidification process; and then using the ribbon, chips, or powder in a powder metallurgy process to manufacture a net-shape component, a near-net-shape component, or a component extruded from a billet. In some embodiments, the method further comprises heat-treating the net-shape component, the near-net-shape component, or the component extruded from the billet at a temperature of about 400° C. to about 480° C. for a time of about 0.25 hours to about 6 hours; and heat-aging the component at a temperature of about 100° C. to about 180° C. for a time of about 1 hour to about 48 hours, to achieve a simultaneous dispersion of fine-scale $Zn_2Mg$ precipitates, primary precipitates having an average diameter of about 0.1 to about 10 µm, and Al—X nano-scale precipitates having an average diameter of about 1 to about 100 nm, and resulting in the component having a strength which is at least as great as that of a component conventionally manufactured from a conventional 7000-series aluminum alloy. In some embodiments, X is Ti, Zr, Hf, V, Nb, Ta, Cr, Mo, W, Mn, Y, La, Ce, Pr, Nd, Pm, Sm, Gd, Tb, Dy, Ho, Er, Tm, Yb, or Lu. In some embodiments, X is Zr.

In some embodiments, an aluminum alloy component is manufactured by fabricating a powder from any of the 7000-series aluminum alloys using a rapid solidification process; and then using the powder in an additive manufacturing process to manufacture a net-shape component or a near-net-shape component. In some embodiments, the method further comprises heat-treating the net-shape component or the near-net-shape component at a temperature of about 400° C. to about 480° C. for a time of about 0.25 hours to about 6 hours; and then heat-aging the component at a temperature of about 100° C. to about 180° C. for a time of about 1 hour to about 48 hours, to achieve a simultaneous dispersion of fine-scale $Zn_2Mg$ precipitates, primary precipitates having an average diameter of about 0.1 to about 10 µm, and Al—X nano-scale precipitates having an average diameter of about 1 to about 100 nm, and resulting in the component having a strength which is at least as great as that of a component conventionally manufactured from a conventional 7000-series aluminum alloy. In some embodiments, X is Ti, Zr, Hf, V, Nb, Ta, Cr, Mo, W, Mn, Y, La, Ce, Pr, Nd, Pm, Sm, Gd, Tb, Dy, Ho, Er, Tm, Yb, or Lu. In some embodiments, X is Zr.

In some embodiments, a method to repair or to form a protective coating on a component made from an aluminum or a magnesium alloy is provided, the method comprising subjecting an aluminum alloy powder as disclosed herein to a cold spray process, a thermal spray process, a laser-assisted cold spray process, or a laser cladding process; and disposing the processed powder on a surface of the component made from an aluminum alloy; thereby repairing or forming a protective coating on the component.

In some embodiments, a method to repair or to form a protective coating on a component made from an aluminum alloy is provided, the method comprising subjecting an aluminum alloy powder as disclosed herein to a cold spray process, a thermal spray process, a laser-assisted cold spray process, or a laser cladding process; and disposing the processed powder on a surface of the component made from an aluminum alloy; thereby repairing or forming a protective coating on the component.

In some embodiments, the method to repair or to form a protective coating, further comprises heat-aging the component made from an aluminum alloy at a temperature of about 100° C. to about 180° C. for a time of about 1 hour to about 48 hours. In some embodiments, prior to the heat-aging step, the component made from an aluminum alloy component of the present disclosure is heat treated at a temperature of about 400° C. to about 480° C. for a time of about 0.25 hours to about 6 hours.

From the foregoing, it will be understood that numerous modifications and variations can be effectuated without departing from the true spirit and scope of the novel concepts of the present disclosure. It is to be understood that no limitation with respect to the specific embodiments illustrated and described is intended or should be inferred.

EXAMPLES

Example 1

Figure 5:
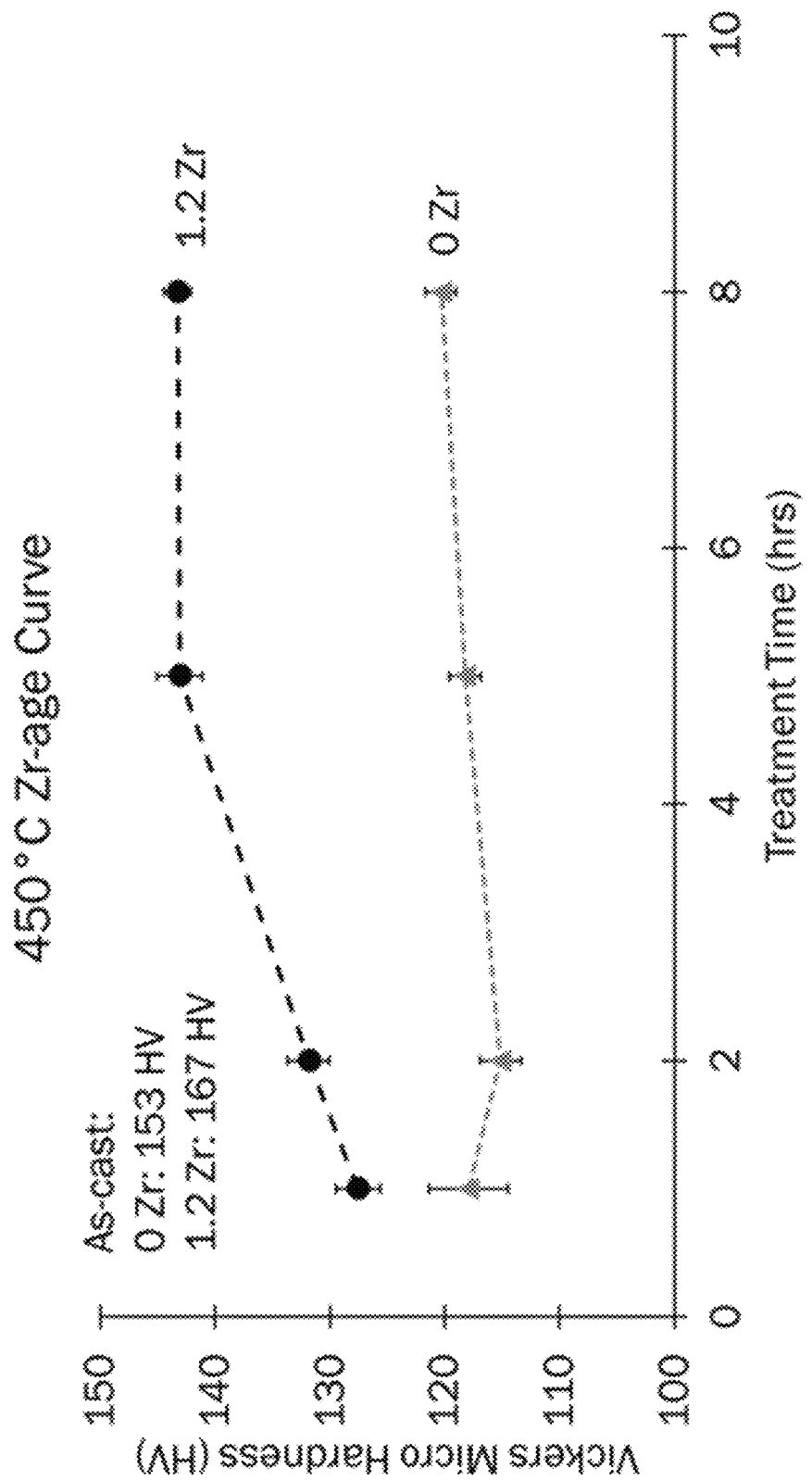
FIG. 5 shows that a conventionally cast Al-10Zn-3Mg alloy softens during a conventional solutionizing heat treatment at 450° C., whereas the Al-10Zn-3Mg-1.2Zr shows a hardening response during the same solutionizing step due the precipitation of $Al_3Zr$ nano-precipitates.

The chemical compositions and physical properties of Example alloy 1 (Zr-free) and the New alloy comprising Zr are compared in Table 2. The two alloys were both fabricated by melt spinning, followed by consolidating into a billet by hot pressing, and then extruding into a profile. Although both compositions have similar hardness after melt spinning, the alloy displays an age-hardening response during the heat treatment whereas the example alloy does not (FIG. 5). Without being bound by any particular theory, it is believed that this is the effect of Al—X precipitates forming during this thermal process. Both alloys respond to a second thermal aging where conventional $Zn_2Mg$ precipitates are formed, and the alloy retains the same incremental increase in hardness over the example alloy.

Figure 3:
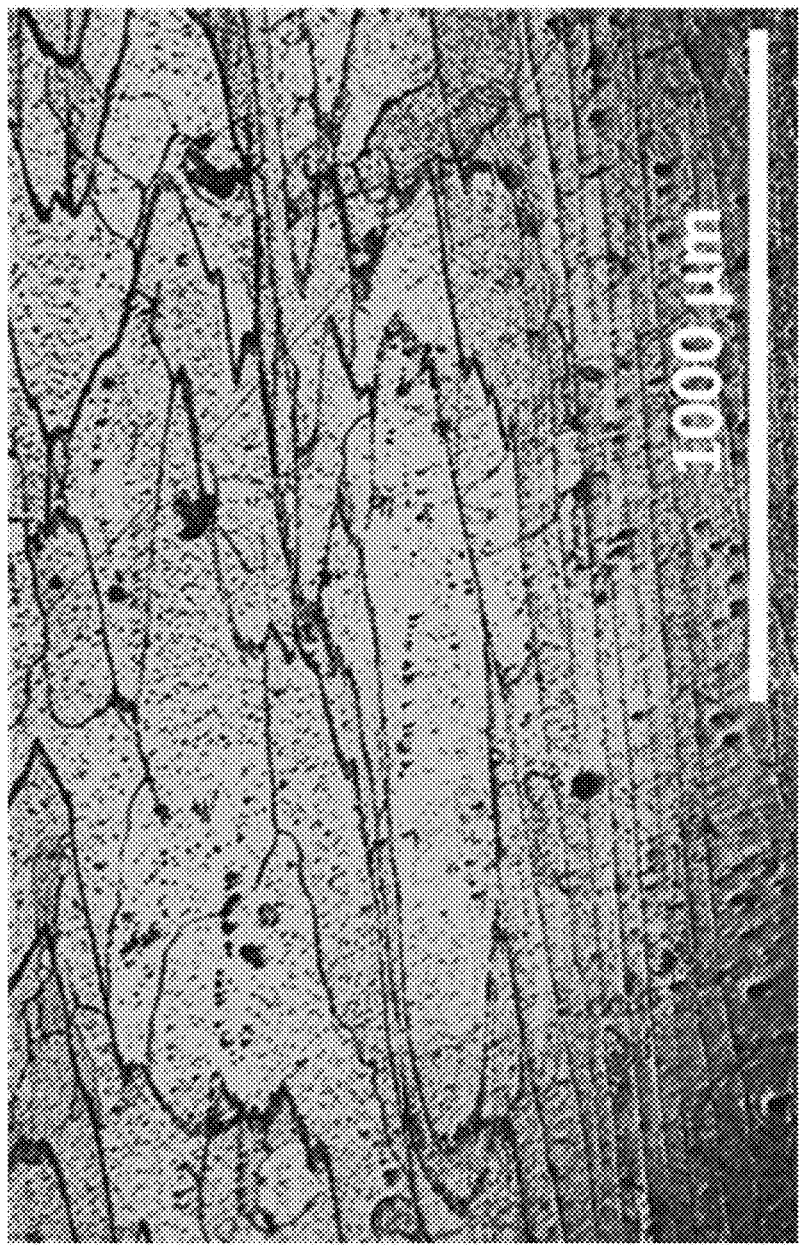
FIG. 3 is an optical micrograph of Al-11Zn-2.5Mg-1Cu wt. % melt-spun ribbons which have been hot-compacted and extruded, solution heat treated and artificially aged. Grains have grown to be hundreds of micrometers in size.
Figure 4:
FIG. 4 is an optical micrograph of Al-11Zn-2.5Mg-1Cu-1.5Zr wt. % melt-spun ribbons which have been hot-compacted and extruded, solution heat treated and artificially aged. The highly refined grain microstructure has been preserved.
Figure 6:
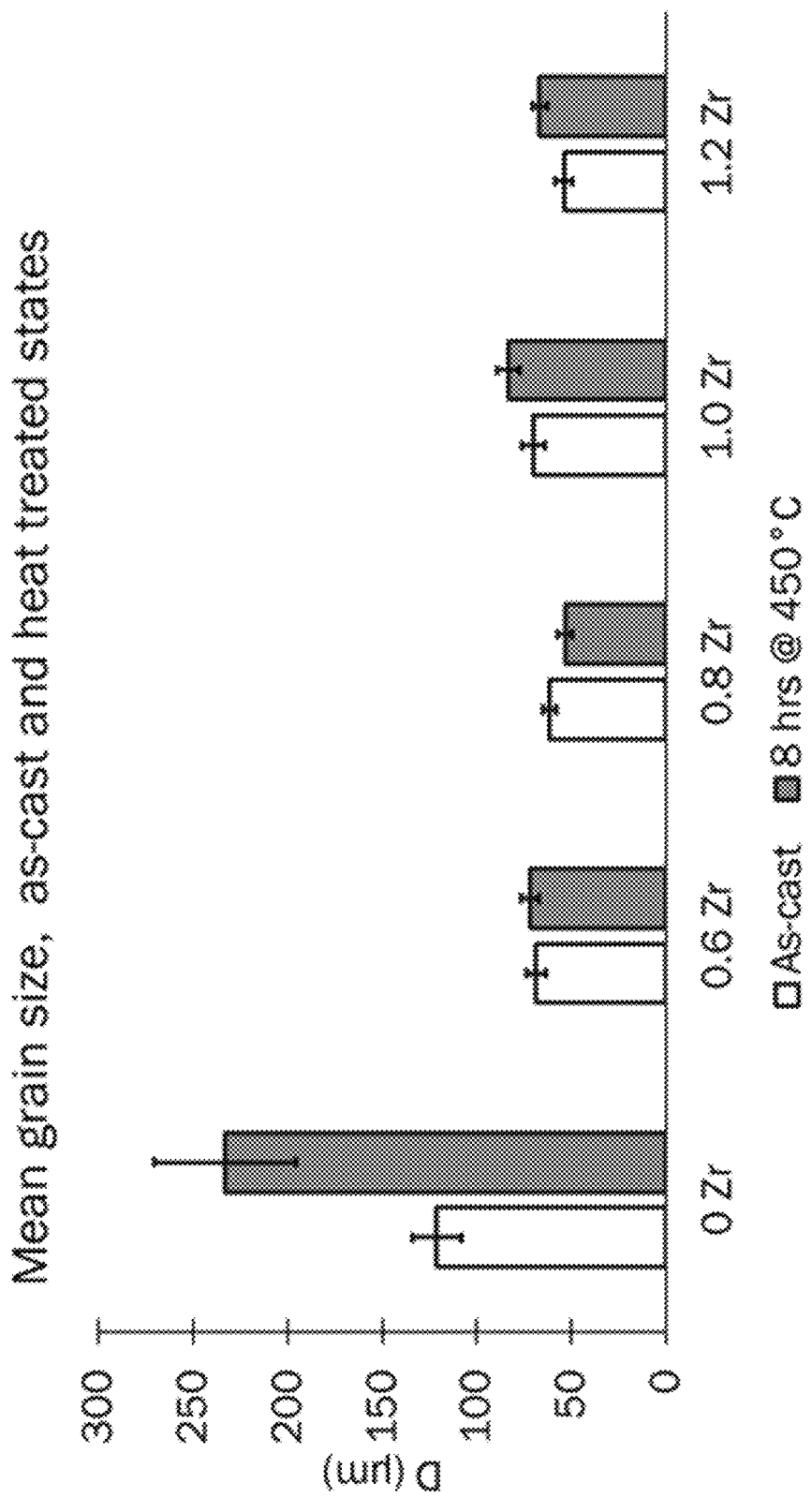
FIG. 6 shows that a conventionally cast Al-10Zn-3Mg alloy experiences grain growth during a conventional solutionizing heat treatment at 450° C. whereas the Al-10Zn-3Mg-(0.6-1.2)Zr exhibits an improved thermal stability and resists grain growth at high temperatures.

The addition of Zr allows the alloy to reach a higher maximum strength and improves its thermal stability by maintaining fine grains during a high temperature heat treatment, as shown in FIG. 3 (example alloy 1), FIG. 4, and FIG. 6.

Figure 2:
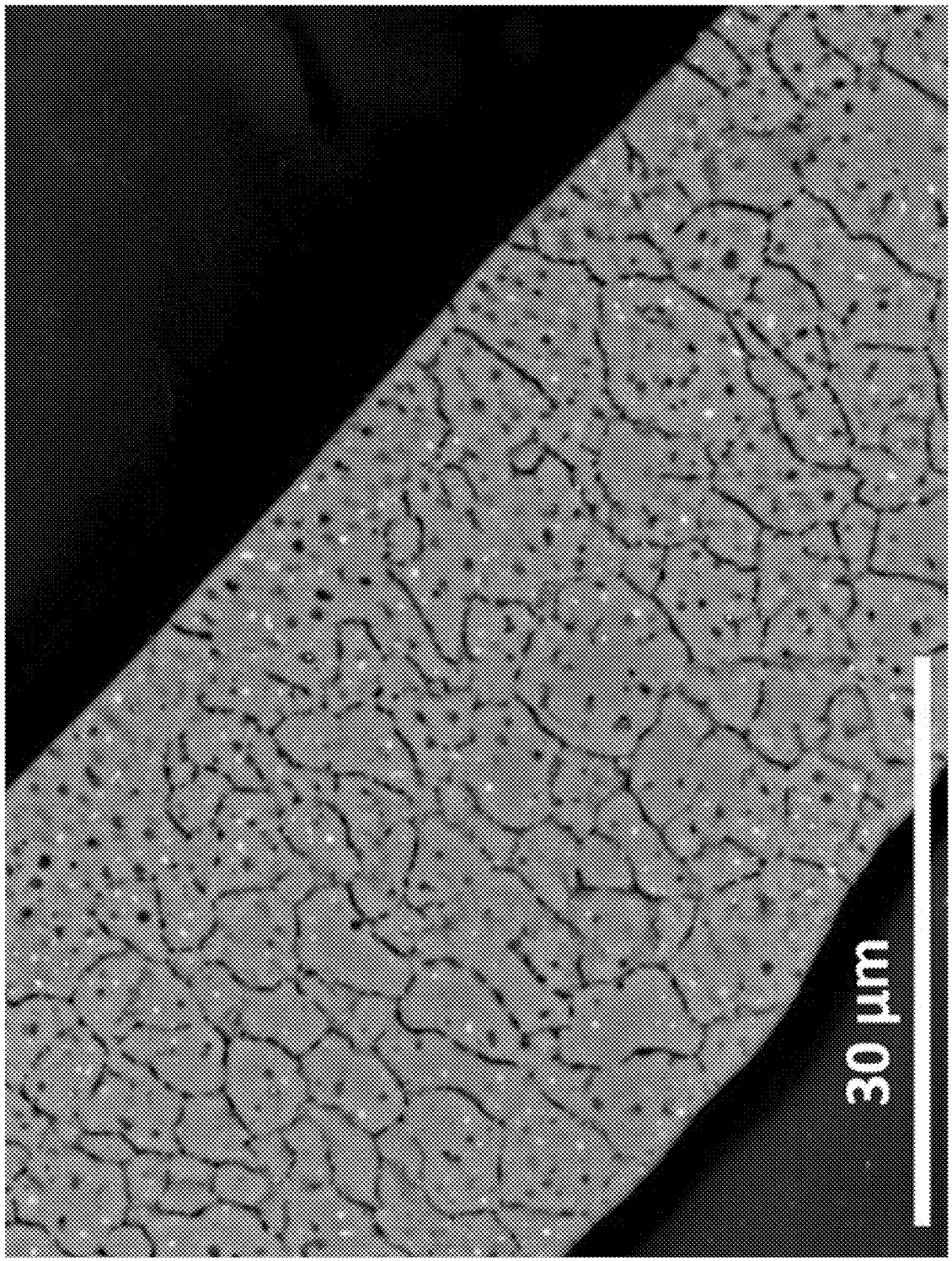
FIG. 2 is a scanning electron micrograph of a melt-spun ribbon of Al-11Zn-2.5Mg-1Cu-1.5Zr wt. %. Grains are highly refined, with multiple grains contained within the ribbon.

The scanning electron micrograph of the melt-spun ribbon of example alloy 1 supports the above findings, and shows that grains are large (FIG. 1). In contrast, the scanning electron micrograph of the alloy from Table 2 shows that grains are highly refined, with multiple grains contained with the ribbon (FIG. 2). Thus, while the conventional alloy exhibits the uninhibited grain growth that ultimately leads to liquation cracking and hot cracking when the material is welded or subjected to additive manufacturing, the aluminum alloy is free from such characteristics. Consequently the alloy is stronger and more thermally stable.

TABLE 2

| | | | | | | Knoop Microhardness (MPa) | | |
| --- | --- | --- | --- | --- | --- | --- | --- | --- |
| Alloy | [Zn] wt. % | [Mg] wt. % | [Cu] wt. % | [Zr] wt. % | As-Melt Spun | Solution Treated (450° C., 1 h) | Artificial Aging (120° C., 10 h) |
| Example alloy 1 | 11 | 2.5 | 1 | 0.0 | 1,560 | 1,620 | 2,300 |
| New alloy | 11 | 2.5 | 1 | 1.5 | 1,650 | 2,060 | 2,850 |

Example 2

Attempts have been made to fabricate conventional 7000-series aluminum alloys by additive manufacturing processes, namely selective laser melting (SLM). Due to hot cracking issues these attempts were largely unsuccessful (example alloy 1) [refer to HRL, Sistiaga publications]. Towards this end, some researchers have worked to develop custom 7000-series alloys tailored for the AM process. One example is an Al—Zn—Mg alloy with large additions of Sc (example alloy 3) [Zhou].

Another solution is to blend the aluminum alloy powder with a second powder which serves as an inoculant to nucleate fine grains during solidification (example alloy 2) [HRL]. While technically feasible, this approach adds complexity and cost.

The alloy has solved the hot cracking issue during printing without using expensive elements like scandium, while at the same time improving the strength over the other examples of 3D printed 7000-series aluminum.

Table 3 lists properties of 7000-series aluminum alloys fabricated by selective laser melting of gas-atomized powder. In all cases, the 3D printed material has been subject to a T6 heat treatment involving a solutionizing step at ~450-480° C. followed by an artificial aging step at ~120° C.

TABLE 3

| Alloy | Alloying Element (wt. %) | | | | | | | Mechanical Properties | | |
|---|---|---|---|---|---|---|---|---|---|---|
| | Zn | Mg | Cu | Zr | Sc | Cr | Al | Yield (MPa) | UTS (MPa) | Elongation (%) |
| 7075 (example 1) | 5.40 | 2.25 | 1.54 | 0 | 0 | 0.19 | Bal. | Unprintable | | |
| 7075 T6 HRL (example 2) | 5.40 | 2.25 | 1.54 | *1 vol % | 0 | 0.19 | Bal. | 325-373 | 383-417 | 3.8-5.4 |
| 7xxx T6 (example 3) | 6.04 | 1.87 | 0 | 0.23 | 0.81 | 0 | Bal. | 418 | 435 | 11.1 [Zhou] |
| New | 6.45 | 2.40 | 0 | 1.35 | 0 | 0 | Bal. | 580 | 600 | 5 |

*Zr added in the form of ZrH$_2$ to powder, not alloyed.

[HRL] Martin, John H., Brennan D. Yahata, Jacob M. Hundley, Justin A. Mayer, Tobias A. Schaedler, and Tresa M. Pollock. "3D printing of high-strength aluminium alloys." Nature 549, no. 7672 (2017): 365.

[Sistiaga] Montero-Sistiaga, Maria L., Raya Mertens, Bey Vrancken, Xiebin Wang, Brecht Van Hooreweder, Jean-Pierre Kruth, and Jan Van Hunmbeeck. "Changing the alloy composition of Al7075 for better processability by selective laser melting." *Journal of Materials Processing Technology* 238 (2016): 437-445.

[Zhou] Zhou, Le, Hao Pan, Holden Hyer, Sharon Park, Yuanli Bai, Brandon McWilliams, Kyu Cho, and Yongho Sohn. "Microstructure and tensile property of a novel AlZnMgScZr alloy additively manufactured by gas atomization and laser powder bed fusion." Scripta Materialia 158 (2019): 24-28.

Example 3

7000-series alloys can be fabricated by rapid solidification processes and consolidated by conventional powder processes. One such alloy is commercially produced AA7034, in which melt spun ribbons are chopped into chips, consolidated into a billet by hot pressing, and extruded into a profile. In this example, a Cu-free 7000-series alloy is produced into powder by gas-atomization (a rapid solidification process), consolidated into a billet by hot pressing, and extruded into a profile (Process 1). Also in this example is a Cu-free 7000-series alloy which is produced into a powder by gas atomization and directly extruded into a profile without an intermediate consolidation step (Process 2).

Although the mechanical properties are similar to an alloy which is commercially produced, it is advantageous to eliminate copper in the alloy chemistry, which improves weldability and corrosion resistance. The addition of zirconium is also advantageous for improving weldability and thermal stability.

Mechanical properties of rapid solidification and extruded 7000-series alloys are provided in Table 4. In all cases, the extruded material has been subject to a T6 heat treatment involving a solutionizing step at ~450-480° C. followed by an artificial aging step at ~120° C.

TABLE 4

| Alloy | Alloying Element (wt. %) | | | | | | | Mechanical Properties | | |
|---|---|---|---|---|---|---|---|---|---|---|
| | Zn | Mg | Cu | Zr | Sc | Other | Al | Yield | UTS | Elong. |
| 7034 T6 | 11-12 | 2-3 | 0.8-1.2 | 0.08-0.30 | 0 | Cr (<0.20) | Bal. | 730 | 750 | 8 |
| Alloy Process 1 | 11 | 3.2 | 0 | 1.4 | 0 | NA | Bal. | 710 | 740 | 3 |
| Alloy Process 2 | 12 | 2.6 | 0 | 1.4 | 0 | NA | Bal. | 684 | 688 | 2 |

[RSP]://www.rsp-technology.com/site-media/user-uploads/rsp_alloys_highstrenght_2018lr.pdf,

What we claim is:

1. A 7000-series aluminum alloy comprising:
10 to 12% by weight zinc;
1 to 4% by weight magnesium;
1.2 to 2% by weight of a transition metal, wherein the transition metal is zirconium;
0 to 3% by weight copper; and
aluminum as the remainder;
wherein the alloy does not comprise any intentionally added scandium, and wherein impurities of manganese, chromium, silicon, and iron combined are less than or equal to 0.5% by weight.

2. The 7000-series aluminum alloy of claim 1, comprising 1 to 3% by weight copper.

3. The 7000-series aluminum alloy of claim 1, wherein the alloy comprises an aluminum matrix with a simultaneous dispersion of $Zn_2Mg$ precipitates, $Al_3Zr$ primary precipitates, and $Al_3Zr$ nano-scale precipitates.

4. The 7000-series aluminum alloy of claim 3, wherein the $Al_3Zr$ primary precipitates have an average diameter ranging from 0.05 to 1.5 μm, and the $Al_3Zr$ nano-scale precipitates have an $L1_2$ crystal structure and an average diameter ranging from 1 to 100 nm.

5. The 7000-series Aluminum alloy of claim 1, wherein the not intentionally added scandium is present in less than 0.05% by weight scandium.

6. The 7000-series Aluminum alloy of claim 1, wherein the silicon and iron impurities in combination are less than or equal to 0.3% by weight.

7. The 7000-series aluminum alloy of claim 1, wherein the alloy has an average grain size after a solutionizing heat treatment of less than 100 μm.

8. The 7000-series aluminum alloy of claim 1, fabricated into a rod, a wire, a ribbon, a powder, or chips.

9. The 7000-series Aluminum alloy of claim 8, wherein the powder is fabricated by a process selected from the group consisting of gas-atomizing, plasma-atomizing, rotating-electrode processing, and mechanical alloying.

10. The 7000-series aluminum alloy of claim 1, fabricated into a component having a yield strength greater than 580 MPa, an ultimate tensile strength greater than 600 MPa, and an elongation at failure of more than 2%.

11. The aluminum alloy of claim 1, wherein the alloy possesses a strength to weight ratio at room temperature of from 120 MPa·cm$^3$/g to 370 MPa·cm$^3$/g.

12. A 7000-series aluminum alloy selected from the group consisting of:
a) Al-12Zn-2.6Mg-1.4Zr;
b) Al-11Zn-3.2Mg-1.4Zr;
c) Al-10Zn-3.0Mg-1.2Zr; and
d) Al-11Zn-2.5Mg-1Cu-1.5Zr,
wherein impurities of manganese, chromium, silicon, and iron combined are less than or equal to 0.5% by weight.

13. A 7000-series aluminum alloy comprising:
10 to 12% by weight zinc;
1 to 4% by weight magnesium;
1.2 to 2% by weight zirconium;
1 to 4% by weight copper; and
aluminum as the remainder;
wherein the alloy does not comprise any intentionally added scandium, and
wherein impurities of manganese, chromium, silicon, and iron combined are less than or equal to about 0.5% by weight.

14. A method of fabricating the 7000-series aluminum alloy of claim 1, the method comprising subjecting the aluminum alloy to a rapid solidification process selected from a group consisting of melt spinning, melt extraction, beam glazing, spray deposition, gas atomization, plasma atomization, and plasma spherization.

15. A method of manufacturing a net-shape component or a near-net-shape component, the method comprising:
subjecting the 7000-series aluminum alloy of claim 1 to an additive manufacturing process to manufacture the net-shape component or the near-net-shape component.

16. The method of claim 15, wherein the 7000-series aluminum alloy is a rod, a wire, a ribbon, a powder, or chips.

17. The method of claim 15, wherein the 7000-series aluminum alloy is a powder.

18. The method of claim 17, wherein the powder is a spherical aluminum alloy powder.

19. The method of claim 17, wherein the additive manufacturing process includes powder bed fusion or selective laser melting, and a laser is used to melt and fuse the powder into a net-shape, or near-net-shape component.

20. The method of claim 17, wherein the additive manufacturing process includes powder directed energy deposition, and a laser is used to melt and fuse a blown powder onto the net-shape or near-net-shape component.

21. The method of claim 15, wherein the additive manufacturing process includes powder bed fusion, selective laser melting, or powder-directed energy deposition.

22. The method of claim 15, wherein the additive manufacturing process Includes melting the 7000-series aluminum alloys and the 7000-series aluminum alloy as a layer to a preexisting substrate or a previously deposited layer of the aluminum alloy.

23. The method of claim 22, wherein the fused layer undergoes rapid solidification to provide a net-shape, or near-net-shape component.

24. The method of claim 15, further comprising:
heat-treating the net-shape or near-net-shape component at a temperature of 400° C. to 480° C. for a time of 0.25 hours to 6 hours.

25. The method of claim 24, wherein after heating treating, the net-shape or near-net-shape component is heat-aged at a temperature of 100° C. to 180° C. for a time of 1 hour to 48 hours, to achieve a simultaneous dispersion of fine-scale $Zn_2Mg$ precipitates, primary precipitates, and Al—X nano-scale precipitates.

26. The method of claim 25, wherein the primary precipitates have an average diameter ranging from 0.1 to 10 μm.

27. The method of claim 25, wherein the Al—X nano-scale precipitates have an average diameter ranging from 1 to 100 nm.

28. The method of claim 25, wherein X is Zr.

29. The method of claim 25, wherein the primary precipitates are Al3Zn primary precipitates.

30. A method of preparing a welded metallic assembly, the method comprising joining two aluminum alloy components with a filler material in a welding process,
wherein the filler material joining the components is the wire or the rod of claim 16; and
wherein the two aluminum alloy components are each independently selected from the group consisting of Al—Zn—Mg alloys, Al—Zn—Mg—Cu alloys, Al—Zn—Mg—Zr alloys, and Al—Zn—Mg—Cu—Zr alloys.

31. A method of manufacturing a net-shape component, a near-net-shape component, or a component extruded from a billet, the method comprising: subjecting the ribbon, chips, or powder of claim 8 to a powder metallurgy process to manufacture the net-shape component, the near-net-shape component, or the component extruded from a billet.

\* \* \* \* \*